(12) United States Patent
Rockwell et al.

(10) Patent No.: US 10,989,417 B2
(45) Date of Patent: Apr. 27, 2021

(54) THERMAL APPLIANCE

(71) Applicant: Owens Corning Intellectual Capital, LLC, Toledo, OH (US)

(72) Inventors: Anthony L. Rockwell, Pickerington, OH (US); Phillip J. Johnson, Louisville, KY (US); Jason Seward, Nashport, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 414 days.

(21) Appl. No.: 15/417,606

(22) Filed: Jan. 27, 2017

(65) Prior Publication Data

US 2017/0211846 A1 Jul. 27, 2017

Related U.S. Application Data

(60) Provisional application No. 62/287,530, filed on Jan. 27, 2016.

(51) Int. Cl.
*F24C 15/32* (2006.01)
*F24H 9/02* (2006.01)

(52) U.S. Cl.
CPC ............ *F24C 15/32* (2013.01); *F24C 15/322* (2013.01); *F24H 9/02* (2013.01); *Y02B 40/00* (2013.01)

(58) Field of Classification Search
CPC .......... F24C 15/32; F24C 15/322; F24H 9/02; Y02B 40/00
USPC ...................... 122/19.2; 126/21 A, 21 R, 198
See application file for complete search history.

(56) References Cited

U.S. PATENT DOCUMENTS

| | | | |
|---|---|---|---|
| 226,468 A | 4/1880 | Woodward | |
| 2,839,044 A * | 6/1958 | Phares | F24C 3/008 126/19 R |
| 4,241,718 A * | 12/1980 | Barnett | F24C 15/006 126/19 R |
| 4,506,651 A | 3/1985 | Paradis | |
| 7,992,602 B1 | 8/2011 | Guenther | |
| 8,770,184 B2 | 7/2014 | Schneider | |
| 2012/0017883 A1 | 1/2012 | Campen et al. | |
| 2013/0186385 A1 | 7/2013 | Choudhary et al. | |
| 2014/0048055 A1 * | 2/2014 | Ruther | A21B 3/02 126/198 |

(Continued)

FOREIGN PATENT DOCUMENTS

| | | |
|---|---|---|
| EP | 849538 | 6/1998 |
| EP | 1520945 | 4/2005 |
| EP | 1898159 | 3/2008 |

(Continued)

OTHER PUBLICATIONS

International Search Report and Written Opinion from PCTD/US17/15257 dated May 26, 2017.

*Primary Examiner* — Steven B McAllister
*Assistant Examiner* — Benjamin W Johnson
(74) *Attorney, Agent, or Firm* — Calfee, Halter & Griswold LLP

(57) ABSTRACT

A thermal appliance is provided. The thermal appliance includes a heating compartment within the enclosure that is surrounded by insulating material. The insulating material comprises one or more layers, and the insulating material includes at least one channel. A channel allows air to travel within the enclosure to hotspot locations.

17 Claims, 29 Drawing Sheets

(56) References Cited

U.S. PATENT DOCUMENTS

2014/0261369 A1\* 9/2014 Tyler .................. F24C 15/006
126/1 F

FOREIGN PATENT DOCUMENTS

| EP | 2615377 | 7/2013 |
|----|---------|--------|
| GB | 2129268 | 5/1984 |
| WO | 2001/088440 | 11/2001 |
| WO | 2014/102158 | 7/2014 |

\* cited by examiner

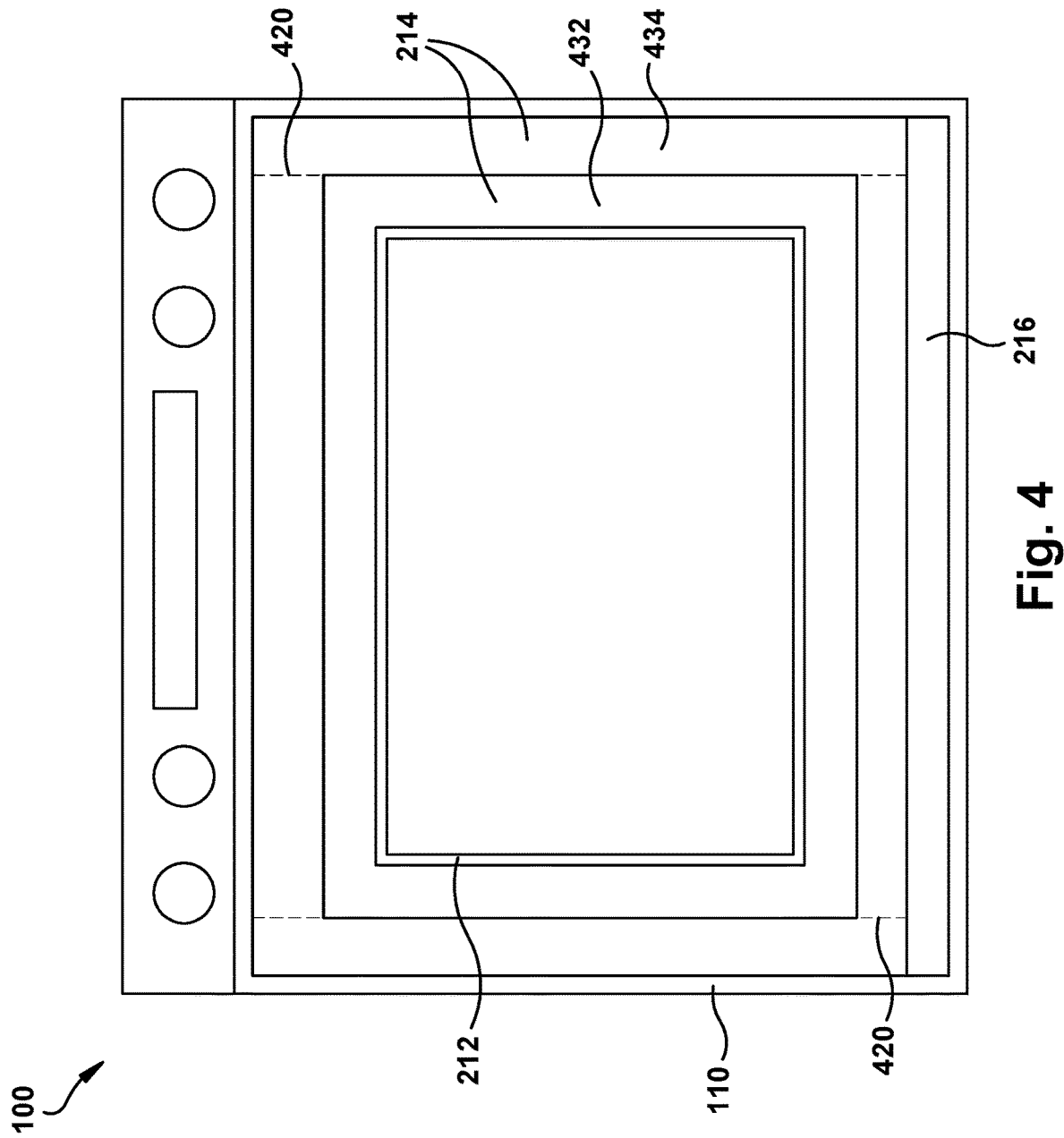

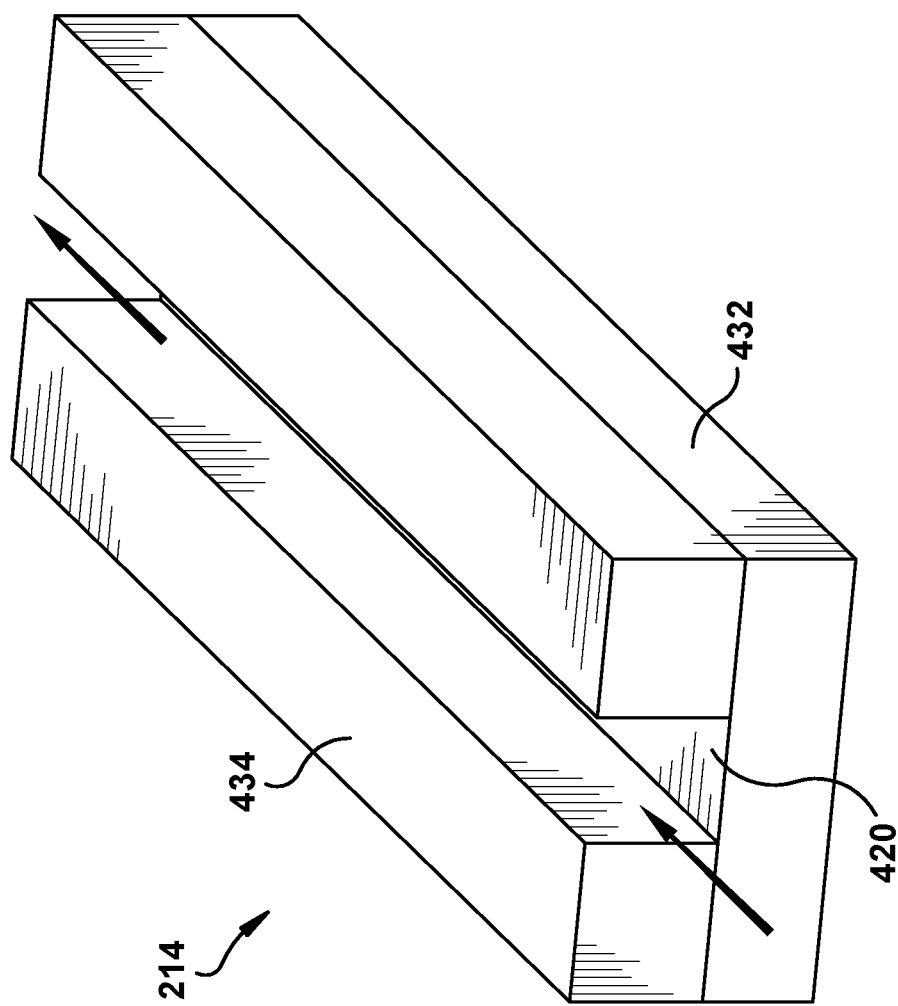

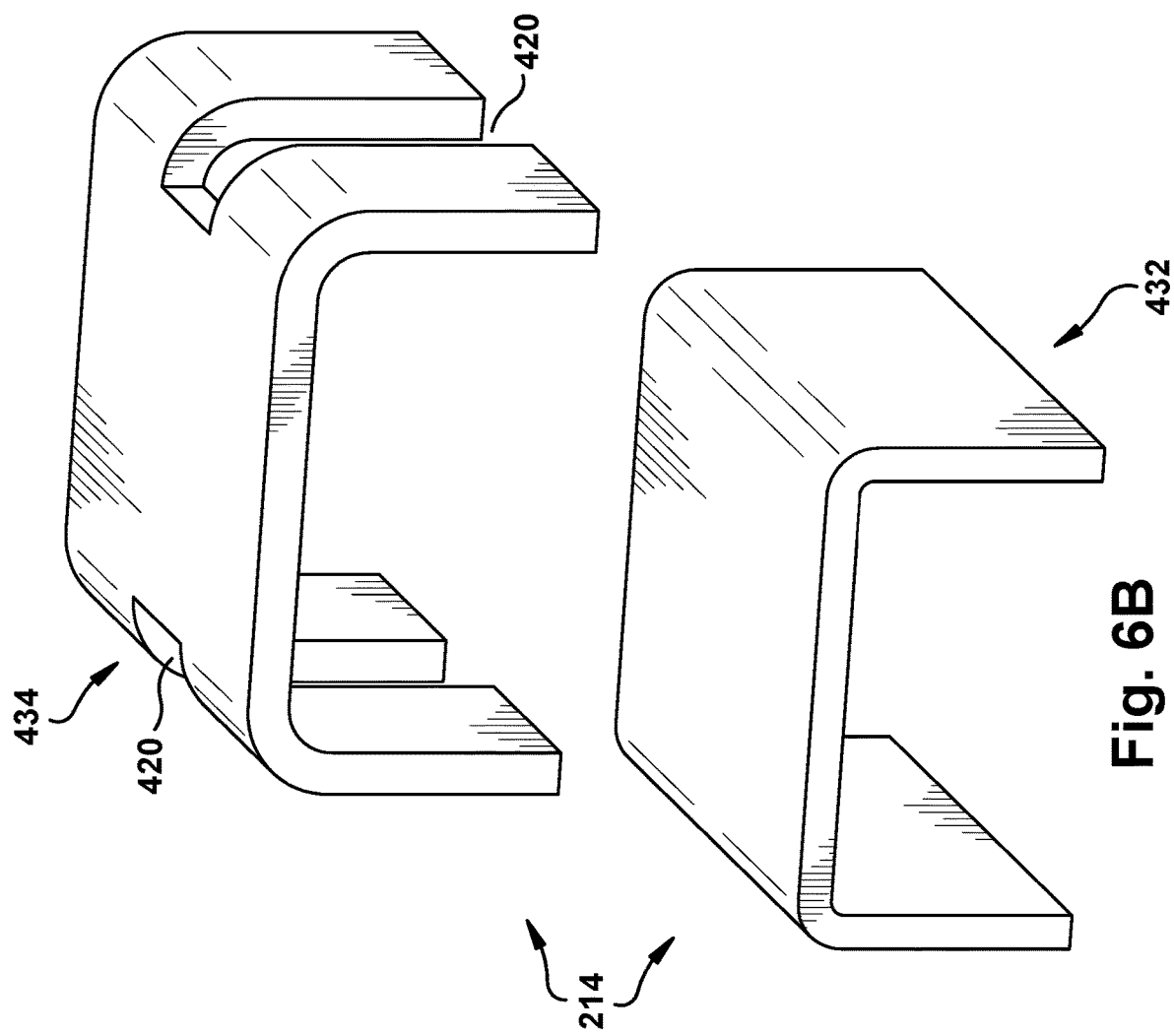

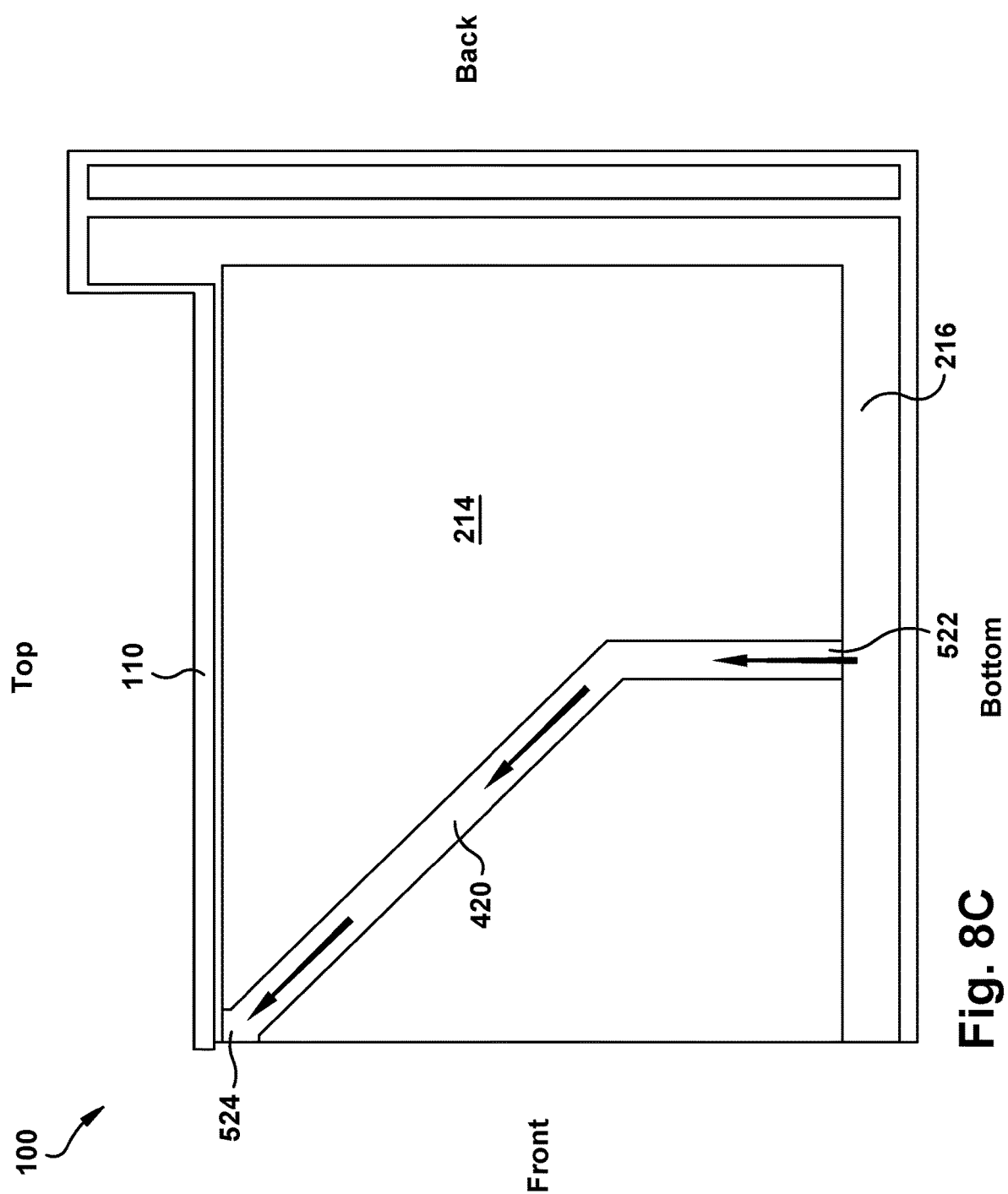

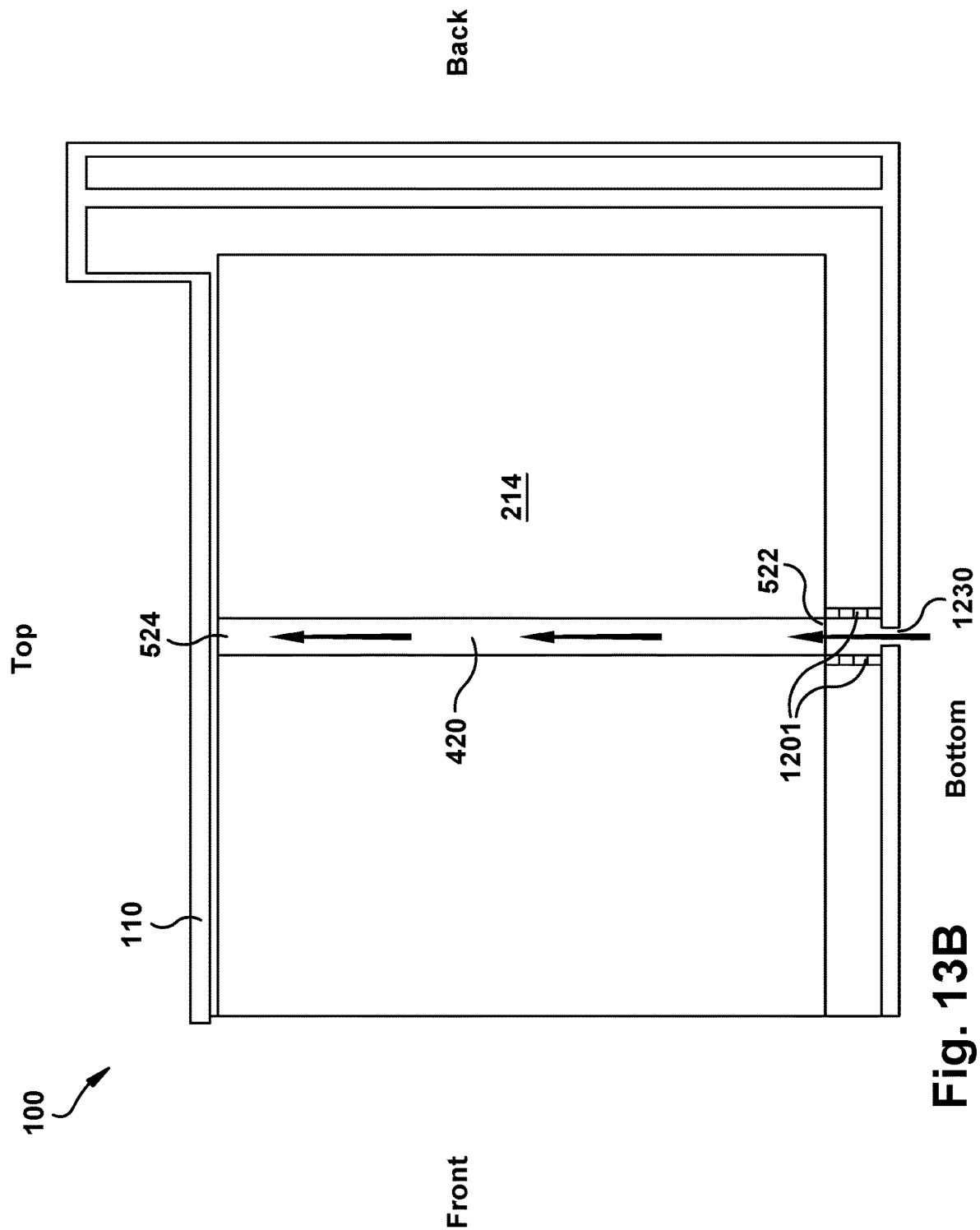

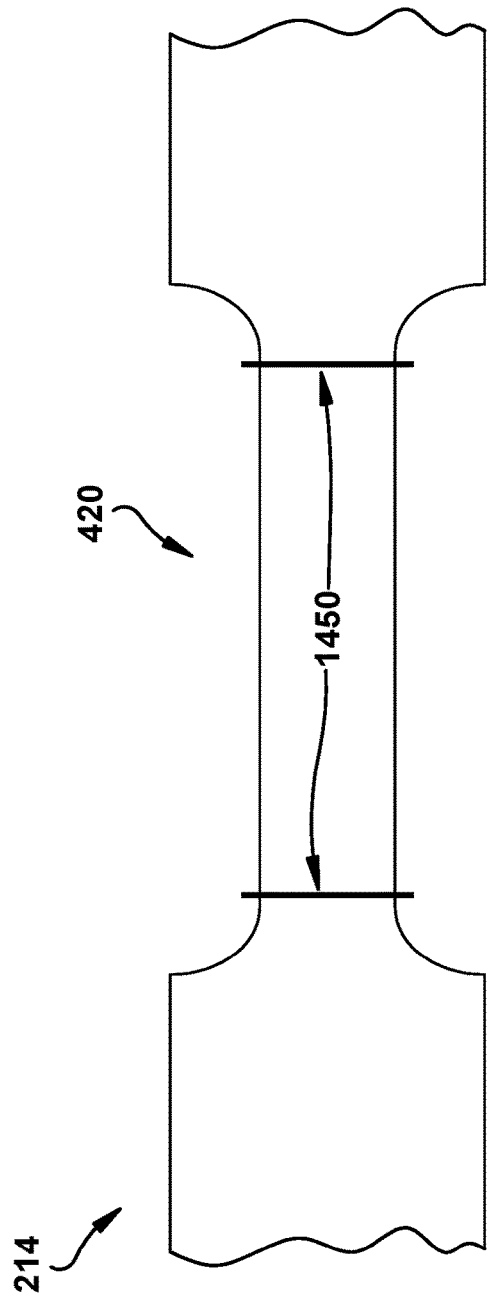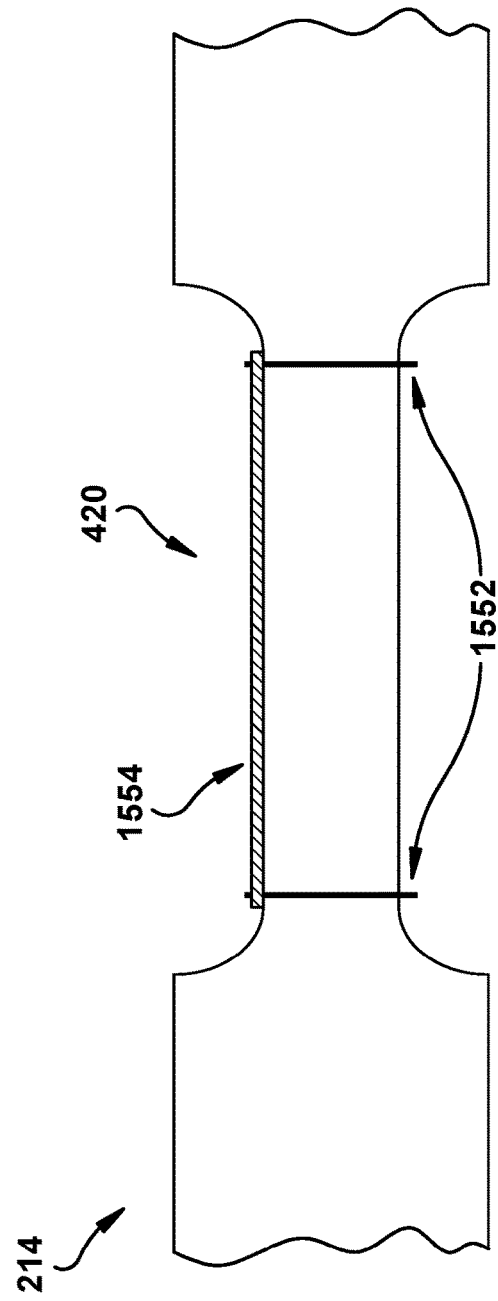

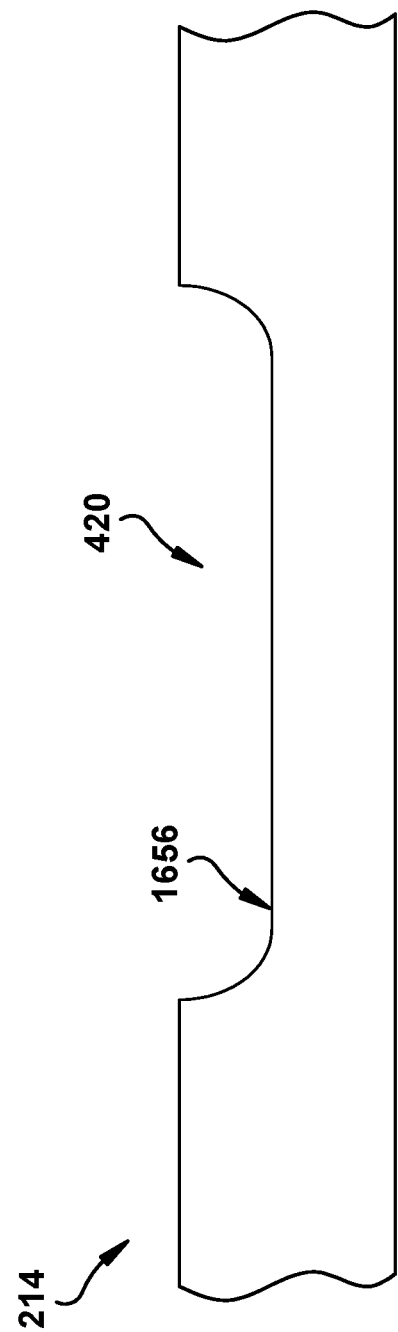

THERMAL APPLIANCE

RELATED APPLICATIONS

This application is related to and claims domestic priority benefits from U.S. Provisional Patent Application Ser. No. 62/287,530 entitled "Thermal Appliance" filed Jan. 27, 2016, the entire contents of which is expressly incorporated herein by reference in its entirety.

TECHNICAL FIELD

This invention relates generally to thermal management systems for controlling the temperature of a heating appliance, such as a thermal oven or a thermal hot water heater, and more specifically relates to controlling the temperature of localized hotspots within the heating appliance.

BACKGROUND

Thermal appliances, such as for example ovens and hot water heaters, use high heat levels for various purposes, including food preparation, self-cleaning, and heating of water. The high heat levels are produced within a heating compartment or a heating tank, which is also the location of the food being prepared, or the interior surfaces being self-cleaned, or the water being heated. Various energy sources, including natural gas, electricity, and oil can be used to produce the high heat levels. The heating compartment or heating tank is typically positioned within a cabinet or a cylindrical enclosure. The cabinet or cylindrical enclosure typically includes side panels, a back panel, a top panel, and a bottom panel. High temperature insulation can be positioned adjacent to the sides, top, back, and bottom of the heating compartment or heating tank. The high temperature insulation is used to control the flow of heat from the sides, top, and bottom of the heating compartment or heating tank to the outside of the enclosure or cabinet. The temperature within the heating compartment or heating tank during normal operation can reach up to 1600 degrees F. (871 degrees C.).

Numerous consumer safety codes have been enacted which relate to the maximum allowable external temperature of the enclosure or cabinet. Since some thermal appliances, such as ovens, are typically positioned adjacent to other fixtures, such as for example other appliances, or are built-in next to wood-based cabinets, the enclosure or cabinet can be very close to or in direct contact with these other fixtures. Additionally, surface temperature limits may be designed around possible exposure to human touch.

SUMMARY

In a thermal appliance embodying the principles of the invention, insulating material including channels are used to eliminate the formation of hotspots in the enclosure of the thermal appliance. The thermal appliance includes a heating compartment within the enclosure that is surrounded by insulating material. The insulating material comprises one or more layers, and the insulating material includes at least one channel. A channel allows air to travel within the enclosure to hotspot locations.

BRIEF DESCRIPTION OF THE DRAWINGS

FIG. 4 is a cross-sectional view taken along the plane indicated by lines 2-2 in FIG. 1 illustrating an exemplary embodiment of a thermal oven comprising two layers of insulating material including channels.

FIGS. 6A-6B are perspective views illustrating exemplary embodiments of the two layers of insulating material including channels provided in FIG. 4.

FIGS. 8A-8C are cross-sectional views taken along the plane indicated by lines 5-5 in FIG. 1 illustrating exemplary embodiments of the thermal oven comprising insulating material including channels provided in FIG. 7.

FIGS. 13A-13C are cross-sectional views taken along the plane indicated by lines 5-5 in FIG. 1 illustrating exemplary embodiments of the thermal oven comprising insulating material including channels, and the slot that allows air into the enclosure provided in FIG. 12.

FIG. 14 is a cross-sectional cutout of an exemplary embodiment of insulating material.

FIG. 15 is a cross-sectional cutout of an exemplary embodiment of insulating material.

FIG. 16 is a cross-sectional cutout of an exemplary embodiment of insulating material.

DETAILED DESCRIPTION

The description and drawings disclose a thermal appliance with reduced surface temperature as compared to existing thermal appliances. A thermal appliance is defined as an apparatus or structure for heating an object positioned within the appliance. Various examples of thermal appliances include traditional residential ovens, commercial ovens, microwave ovens, hot water heaters, or any other apparatus or structure sufficient to heat an object positioned within the appliance.

The present application discloses a thermal appliance comprising an enclosure and a heating compartment within the enclosure. Additionally, the present application discloses an insulating material disposed between the heating compartment and the enclosure wherein the insulating material comprises one or more layers. The insulating material includes at least one channel to allow air to flow in a space between the enclosure and the heating compartment. The insulation material can take a wide variety of different forms. In one exemplary embodiment, the insulating material is relatively dense, so that the channel is not filled in by the insulating material. A wide variety of different insulating materials can be used. Examples of suitable insulating materials are disclosed in U.S. patent application Ser. No. 14/465,908, titled Method of Forming a Web from Fibrous Material, filed on Aug. 22, 2014, which is incorporated herein by reference in its entirety.

Figure 1:
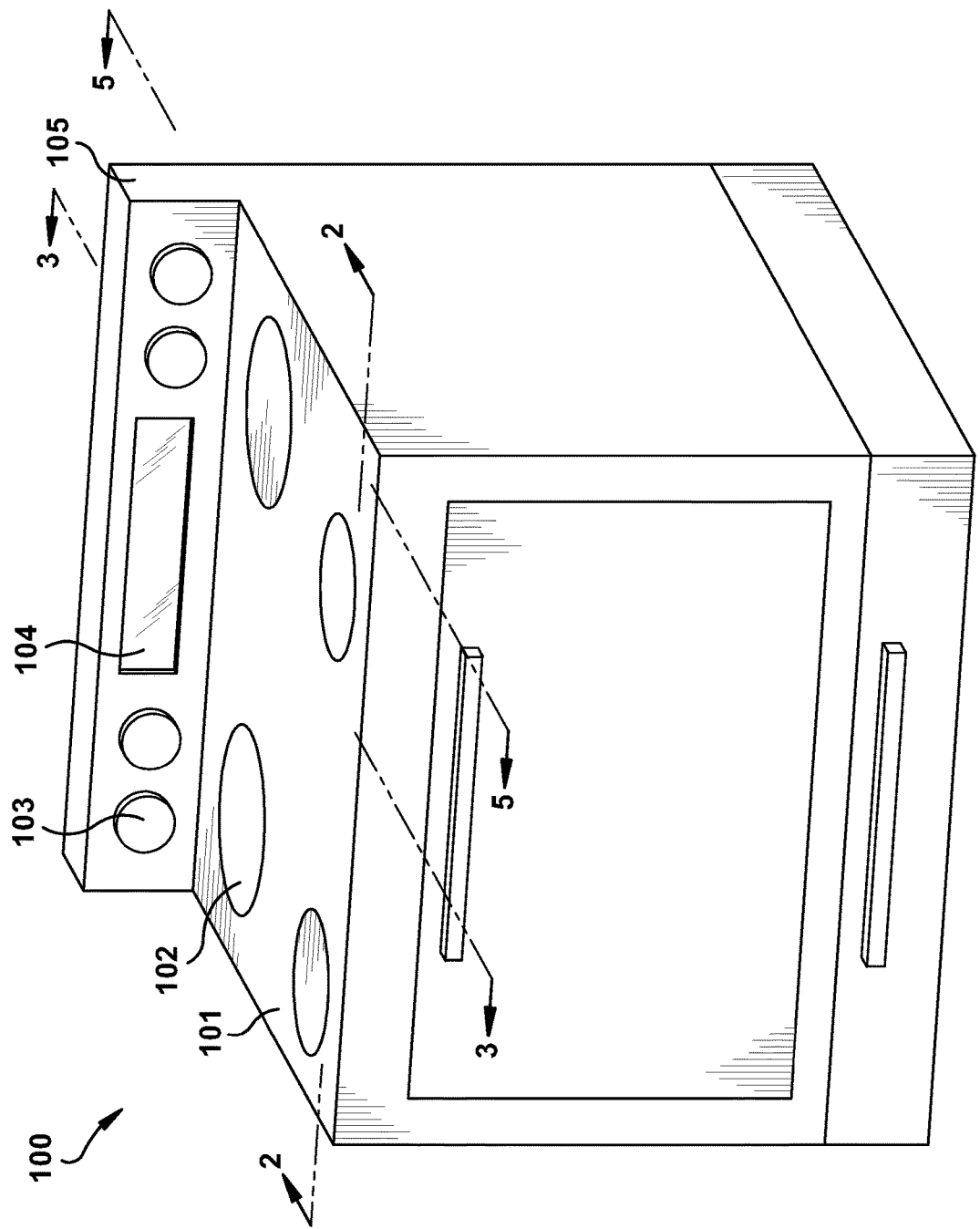
FIG. 1 is a perspective view of a thermal oven.
Figure 2:
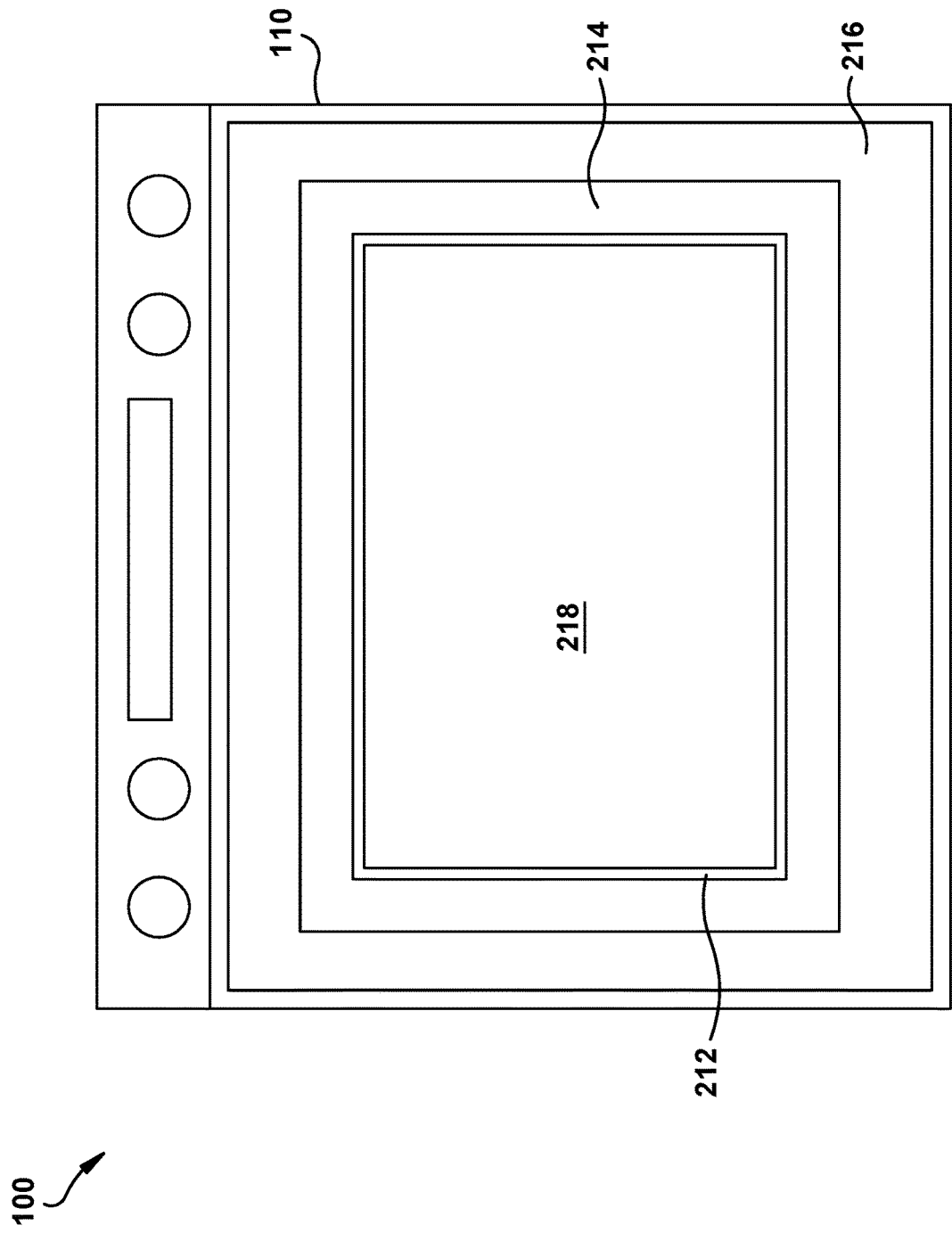
FIG. 2 is a cross-sectional view taken along the plane indicated by lines 2-2 in FIG. 1 illustrating a prior art thermal oven.

FIG. 1 is a perspective view of a thermal appliance, such as a thermal oven 100. The concepts of the present application apply to other thermal appliances, such as water heaters. The thermal oven 100 includes a substantially flat, top cooking surface 101. A plurality of heating elements or burners 102 are typically positioned on the top cooking surface 101, although the heating elements or burners 102 are optional. The thermal oven 100 includes a plurality of controls 103 for controlling the temperature of the burners 102 and a control panel 104 for controlling the temperature within an oven cavity 218 (FIG. 2). Typically, the controls 103 and the control panel 104 are mounted on a backsplash 105.

Figure 3:
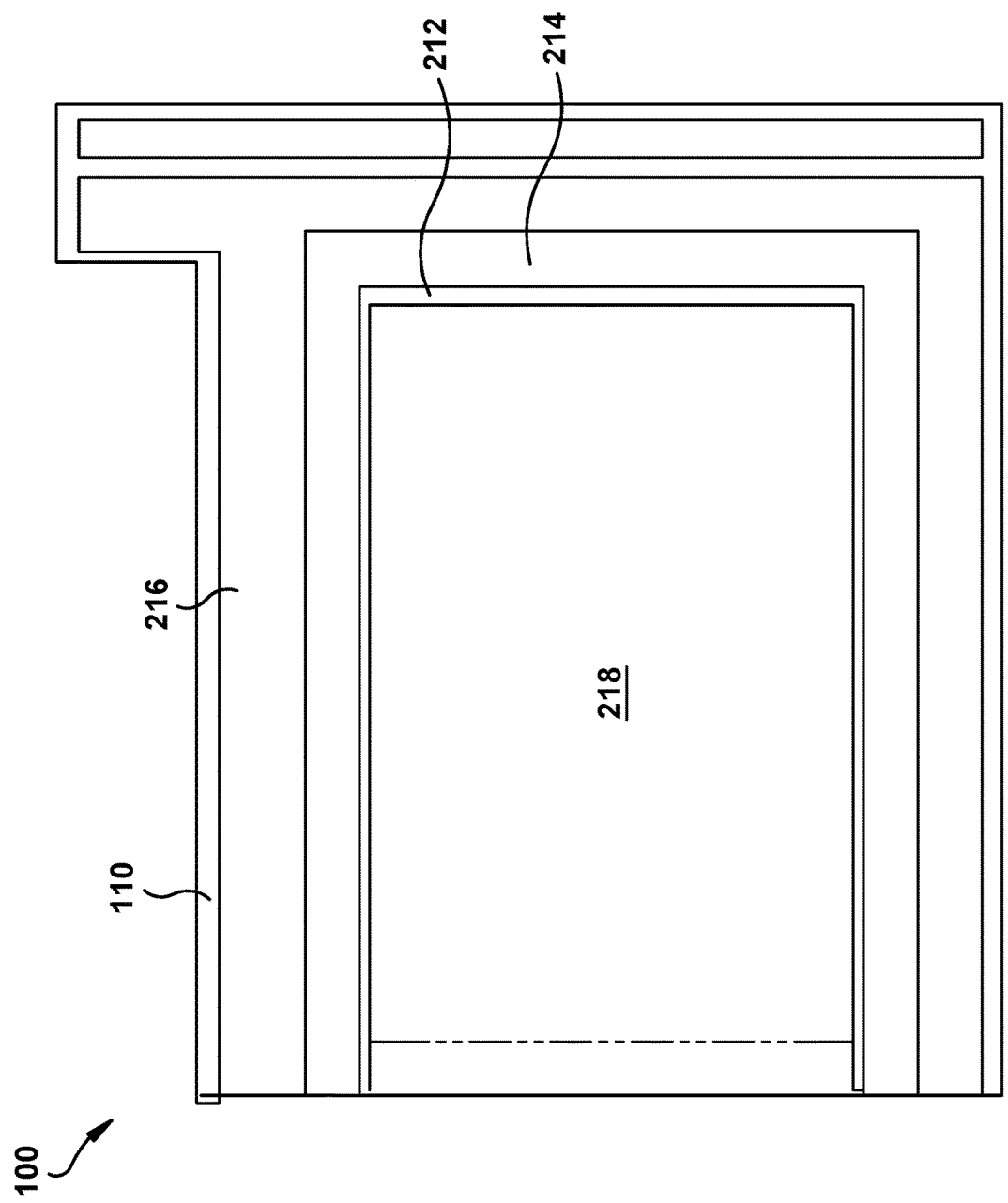
FIG. 3 is a cross-sectional view taken along the plane indicated by lines 3-3 in FIG. 1.

FIGS. 2 and 3 are cross-sectional views taken along the plane indicated by lines 2-2 and 3-3 in FIG. 1 illustrating a prior art thermal oven 100. The thermal oven 100 includes an enclosure 110, an air gap 216, a single layer of insulating material 214, a heating compartment 212, and an oven cavity 218. The insulating material 214 keeps heat within the heating compartment 212. The air gap 216 allows air to cool down hotspot areas. However, the insulating material 214 will not completely prevent heat from leaving the heating compartment 212, and the air gap 216 will not completely prevent hotspot areas from forming. The top corners of the enclosure 110 are a common location for hotspot areas to form.

FIG. 4 is a cross-sectional view taken along the plane indicated by lines 2-2 in FIG. 1 illustrating an exemplary embodiment of a thermal oven 100 comprising two layers of insulating material 214 including channels 420. The insulating material 214 comprises an inner layer 432 and an outer layer 434. In one embodiment, the insulating material 214 extends from the heating compartment 212 to the top and side surfaces of the enclosure 110, which allows the insulating material 214 to be more efficient in containing the heat within the heating compartment 212. Additionally, the channels 420 are located in a manner that allows air to travel to the most likely hotspot areas. In this embodiment, air travels from the air gap 216 through the channels 420 to the most likely hotspot areas within the enclosure 110.

Figure 5A:
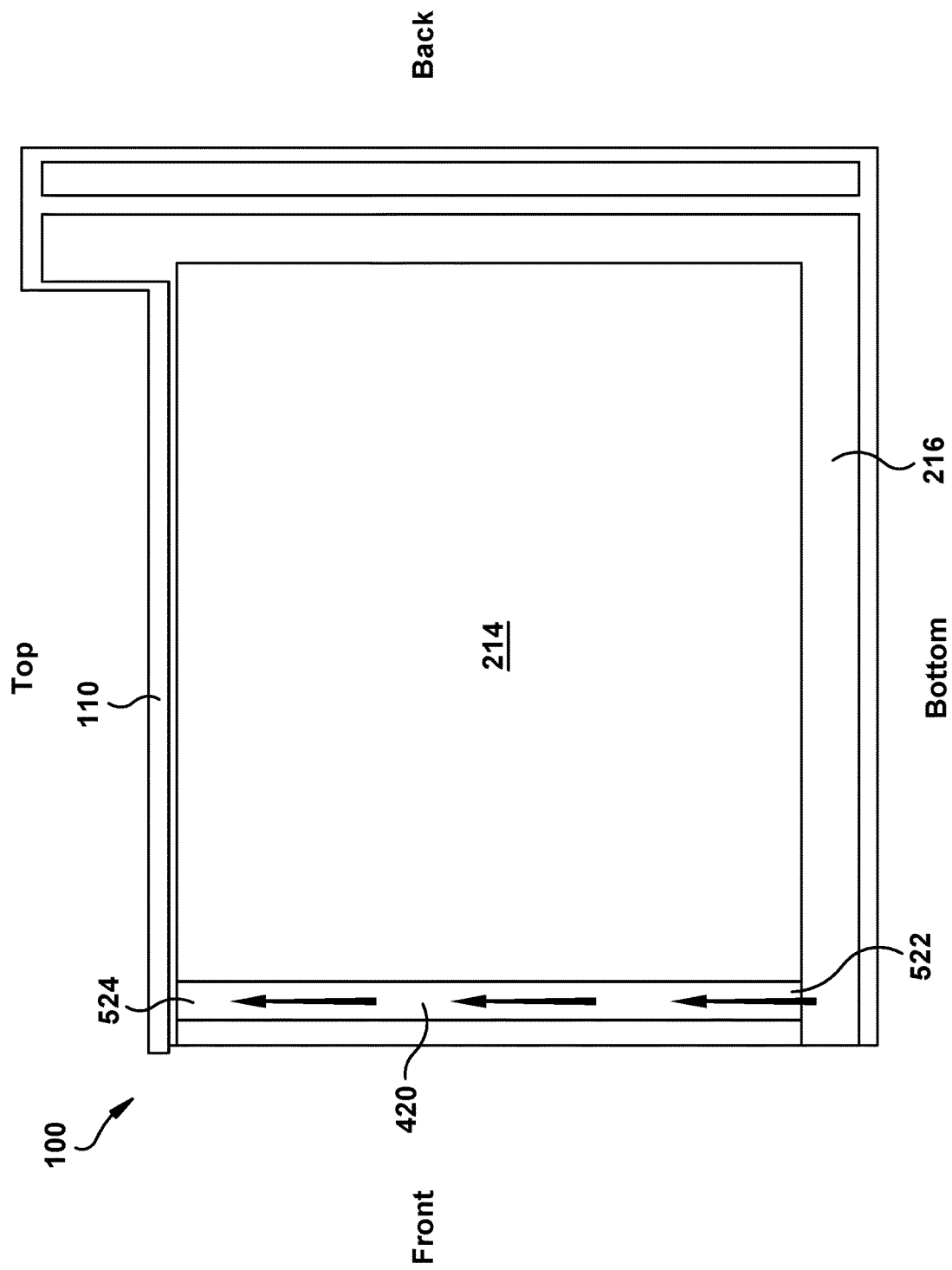
FIGS. 5A-5C are cross-sectional views taken along the plane indicated by lines 5-5 in FIG. 1 illustrating exemplary embodiments of the thermal oven comprising insulating material including channels provided in FIG. 4.
Figure 5B:
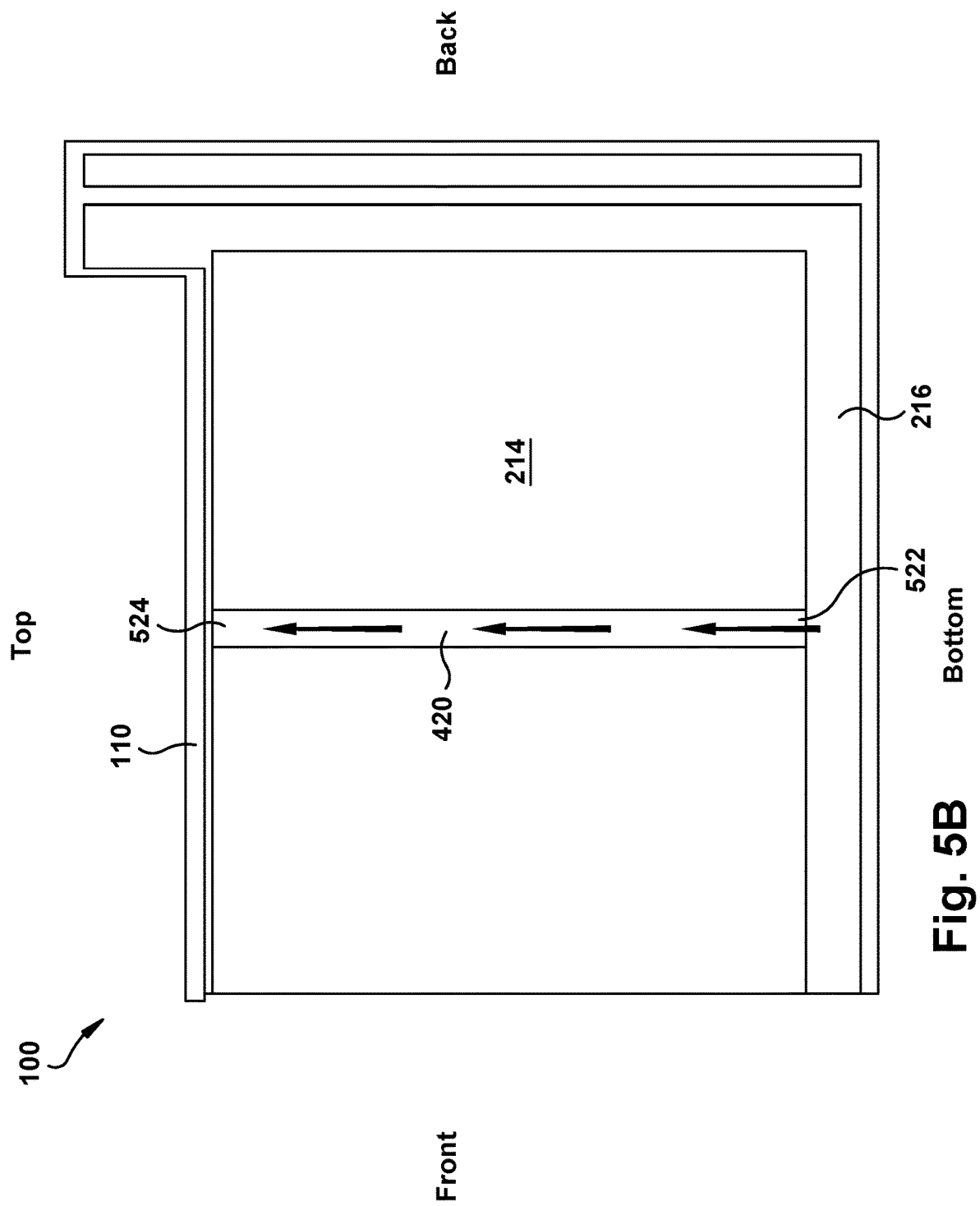
Figure 5C:
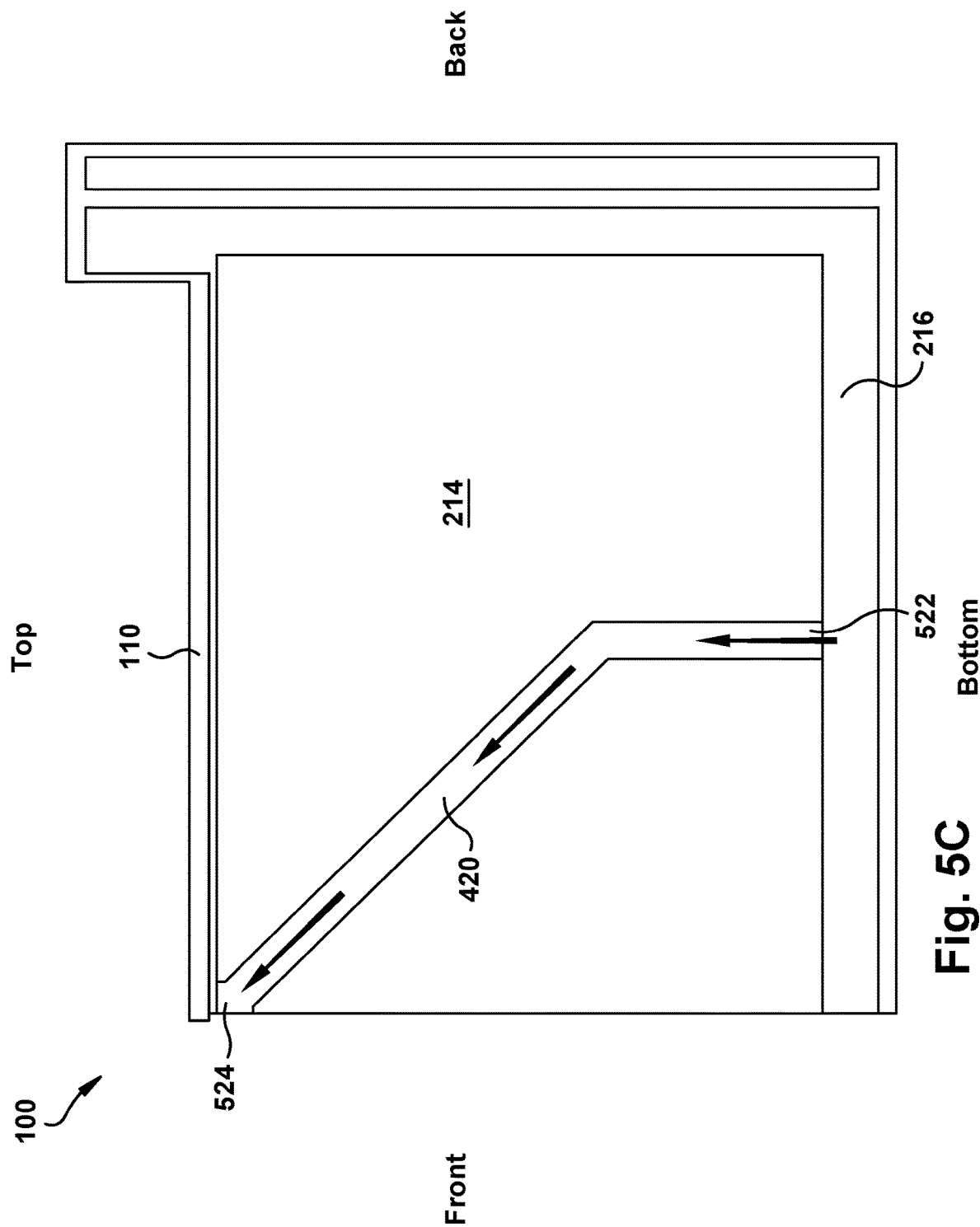

FIGS. 5A-5C are cross-sectional views taken along the plane indicated by lines 5-5 in FIG. 1 illustrating the exemplary embodiment of the thermal oven 100 comprising the insulating material 214 including channels 420 provided in FIG. 4. In the following exemplary embodiments, air enters the channel 420 through the inlet 522, and air exits the channel 420 through the outlet 524. In one embodiment, as shown in FIG. 5A, the channel 420 is located toward the front of the enclosure 110, and the channel 420 is in a straight vertical line from the air gap 216 to a likely hotspot area. In another embodiment, as shown in FIG. 5B, the channel 420 is located toward the center of the enclosure 110, and the channel 420 is in a straight vertical line from the air gap 216 to a likely hotspot area. In a different embodiment, as shown in FIG. 5C, the channel 420 may have an inlet 522 near the center of the bottom surface of the enclosure 110 and an outlet 524 near the top of the front surface of the enclosure 110. The above-mentioned embodiments are only exemplary. A channel 420 may be configured in several different ways, such as straight vertical or horizontal lines, diagonal lines, curved lines, or any combination thereof. Additionally, the inlet 522 of the channel 420 may be located any position that allows the channel 420 to receive a desired amount and/or quality of air. Also, the outlet 524 of the channel 420 may be located in any location that potentially could be a hotspot area.

FIGS. 6A-6B are perspective views illustrating exemplary embodiments of the two layers of insulating material 214 including channels 420 provided in FIG. 4. In one embodiment, as shown in FIG. 6A, the channel 420 is located in the outer layer 434 of the insulating material 214, and the walls of the channel 420 are formed by both the inner layer 432 and outer layer 434 of the insulating material 214. FIG. 6B illustrates an exemplary embodiment of the inner layer 432 and outer layer 434 of the insulating material 214 when layers (432, 434) are separated from each other. In the exemplary embodiments provided in FIGS. 6A and 6B, the channel 420 is made up of surfaces from both the inner layer 432 and outer layer 434 of the insulating material 214. However, a channel 420 may be configured in several different ways. The walls of a channel 420 may be made solely by the outer layer 434, or the walls may be made solely by the inner layer 432. A channel may be located in both the inner layer 432 and outer layer 434 of the insulating material 214. A channel 420 may be located only in the inner layer 432 of the insulating material 214, or a channel 420 may be located only in the outer layer 434 of the insulating material 214.

Figure 7A:
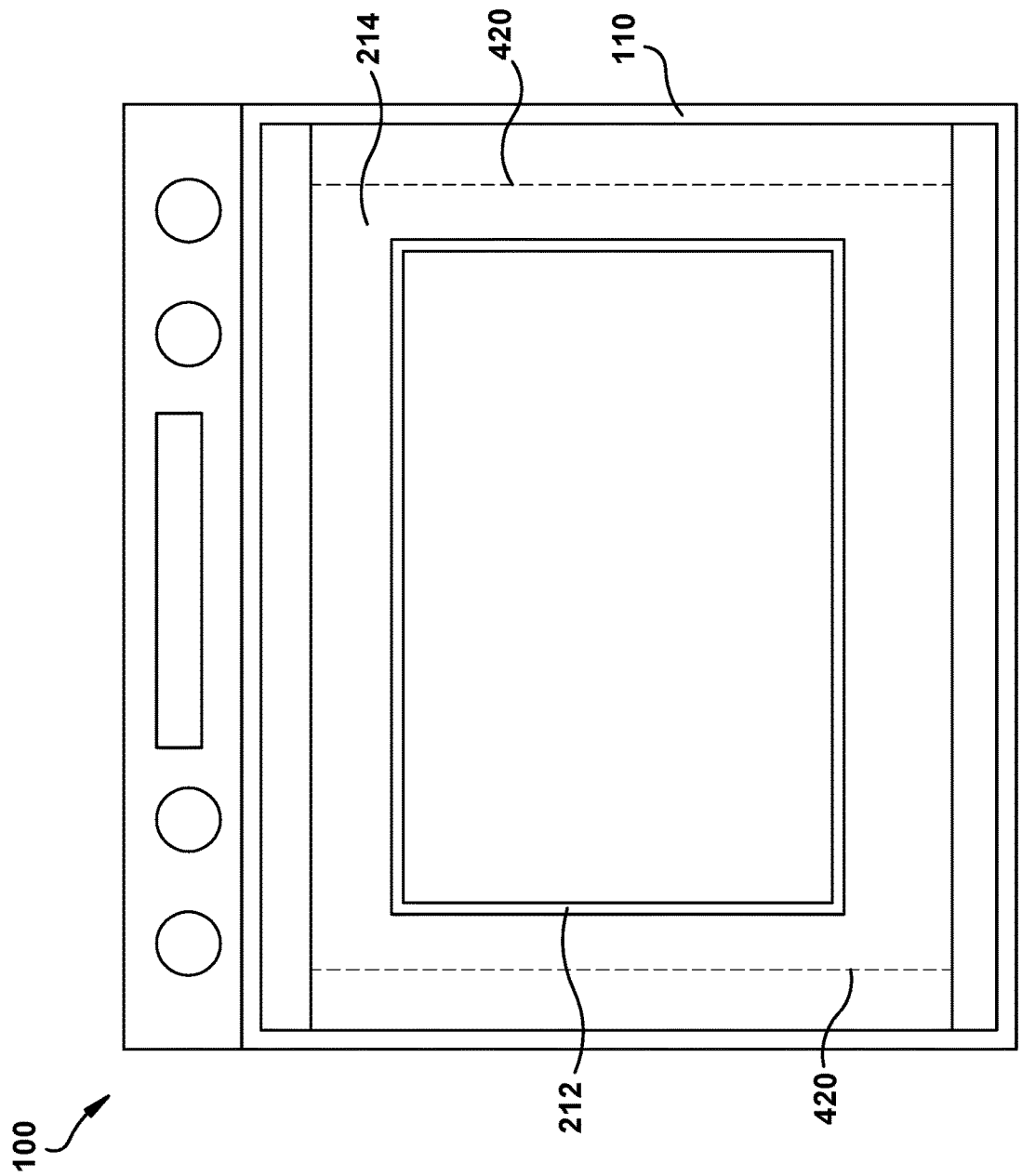
FIG. 7A is a cross-sectional view taken along the plane indicated by lines 2-2 in FIG. 1 illustrating an exemplary embodiment of a thermal oven comprising insulating material including channels.

FIG. 7A is a cross-sectional view taken along the plane indicated by lines 2-2 in FIG. 1 illustrating an exemplary embodiment of a thermal oven 100 comprising insulating material 214 including channels 420. In one embodiment, one layer of insulating material 214 extends to the side surfaces of the enclosure 110, which allows the insulating material 214 to be more efficient in containing the heat within the heating compartment 212. Additionally, the channels 420 are located in a manner that allows air to travel to the most likely hotspot areas within the enclosure 110.

Figure 7B:
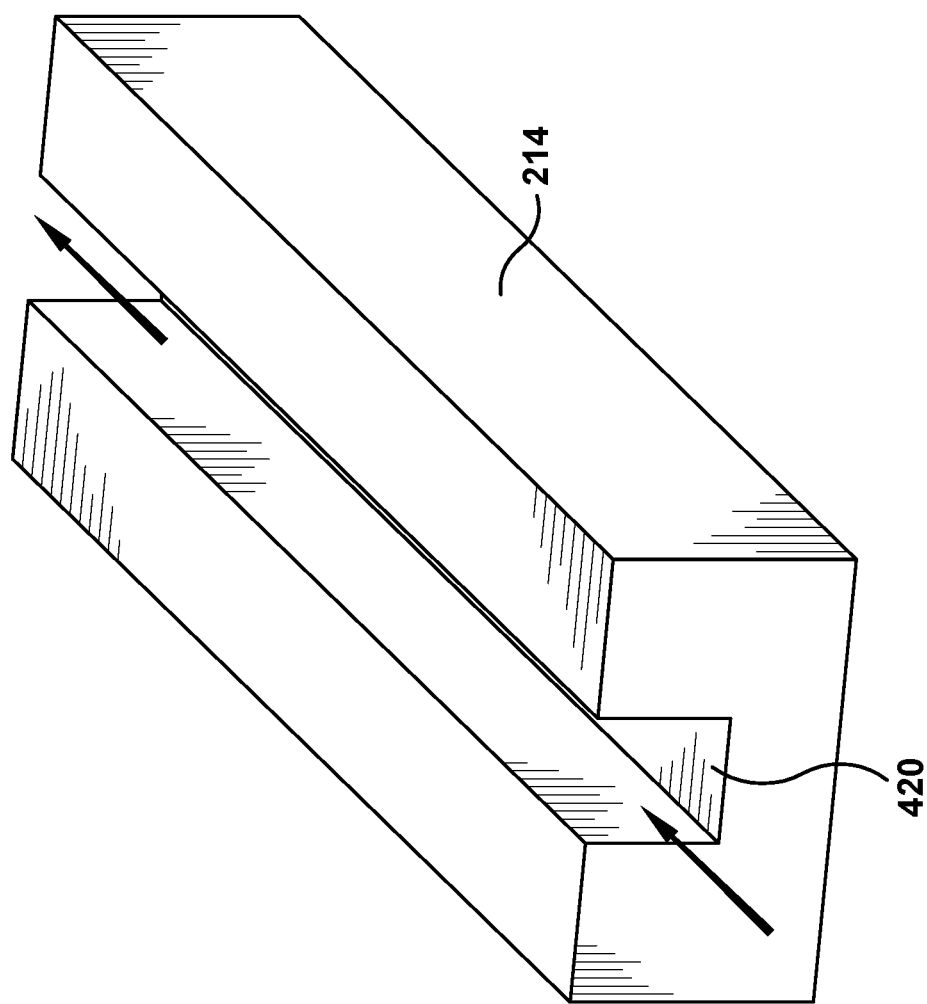
FIG. 7B is a perspective view illustrating an exemplary embodiment of the insulating material including channels provided in FIG. 7A.

FIG. 7B is a perspective view illustrating an exemplary embodiment of the insulating material including channels 420 provided in FIG. 7A. In one embodiment, as shown in FIG. 7B, the insulating material 214 is made of only one layer, and the channel 420 is located in the one layer of insulating material 214. The above-mentioned embodiments are only exemplary. Insulating material may be made of multiple layers, and channels may be located within one or more layers of insulating material.

Figure 8A:
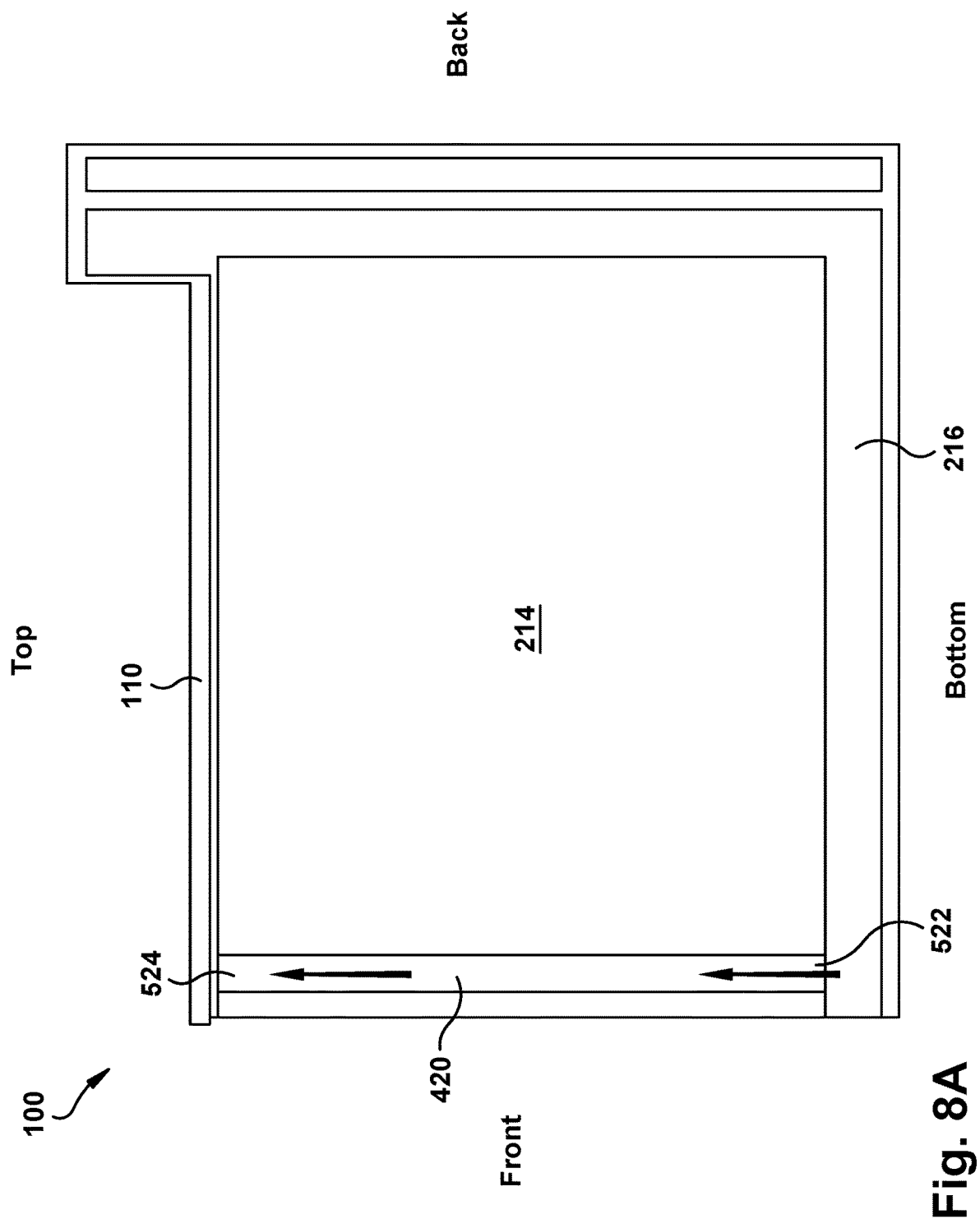
Figure 8B:
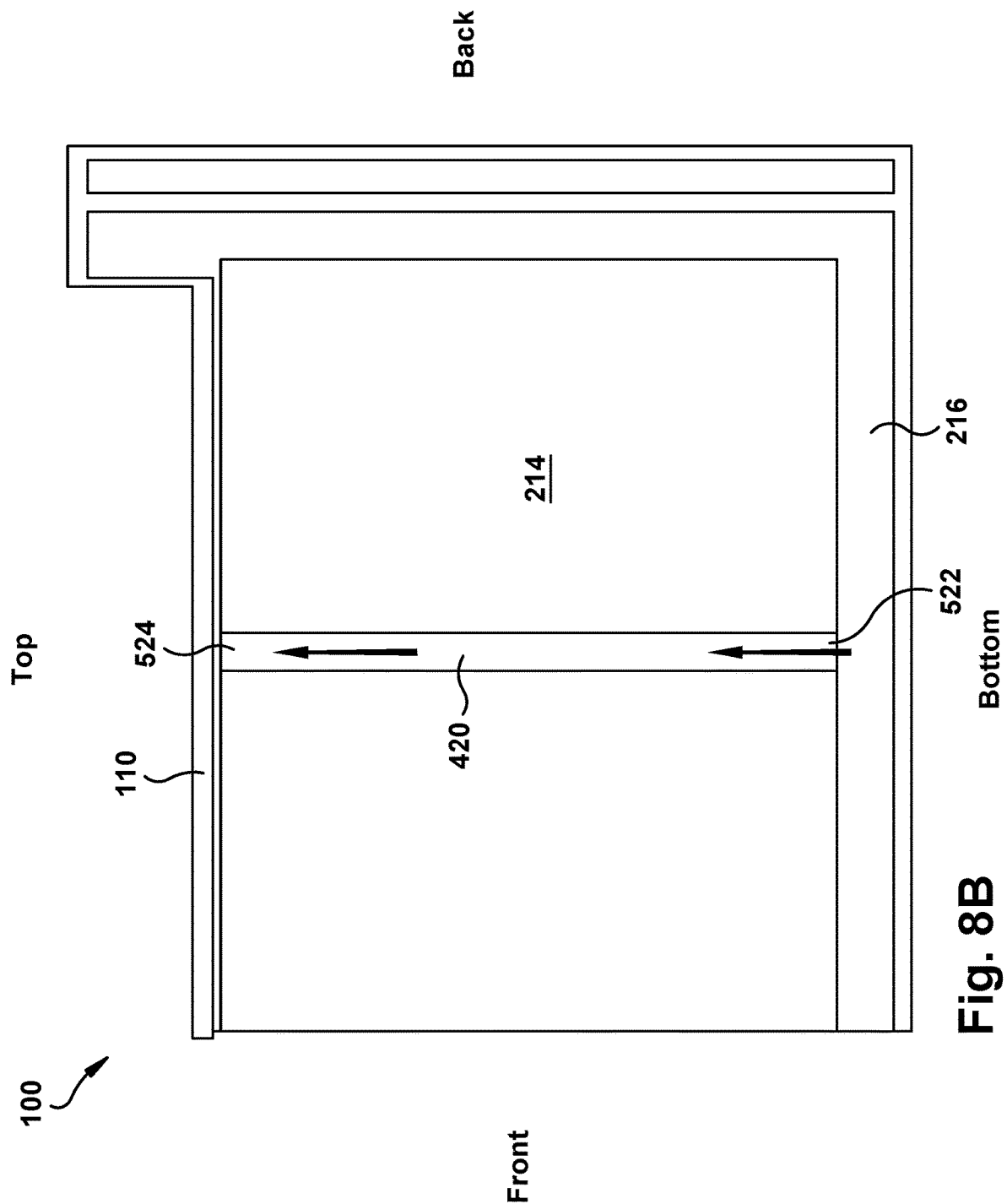

FIGS. 8A-8C are cross-sectional views taken along the plane indicated by lines 5-5 in FIG. 1 illustrating exemplary embodiments of the thermal oven 100 comprising the insulating material 214 including channels 420 provided in FIG. 7A. In the following exemplary embodiments, air enters the channel 420 through the inlet 522, and air exits the channel 420 through the outlet 524. In one embodiment, as shown in FIG. 8A, the channel 420 is located toward the front of the enclosure 110, and the channel 420 is in a straight vertical line from the air gap 216 to a likely hotspot area. In another embodiment, as shown in FIG. 8B, the channel 420 is located toward the center of the enclosure 110, and the channel 420 is in a straight vertical line from the air gap 216 to a likely hotspot area. In a different embodiment, as shown in FIG. 8C, the channel 420 may have an inlet 522 near the center of the bottom surface of the enclosure 110 and an outlet 524 near the top of the front surface of the enclosure 110. The above-mentioned embodiments are only exemplary. A channel 420 may be configured in several different ways, such as straight vertical or horizontal lines, diagonal lines, curved lines, or any combination thereof. Additionally, the inlet 522 of the channel 420 may be located at any position that allows the channel 420 to receive a desired amount and/or quality of air. Also, the outlet 524 of the channel 420 may be located in any location that potentially could be a hotspot area.

Figure 9:
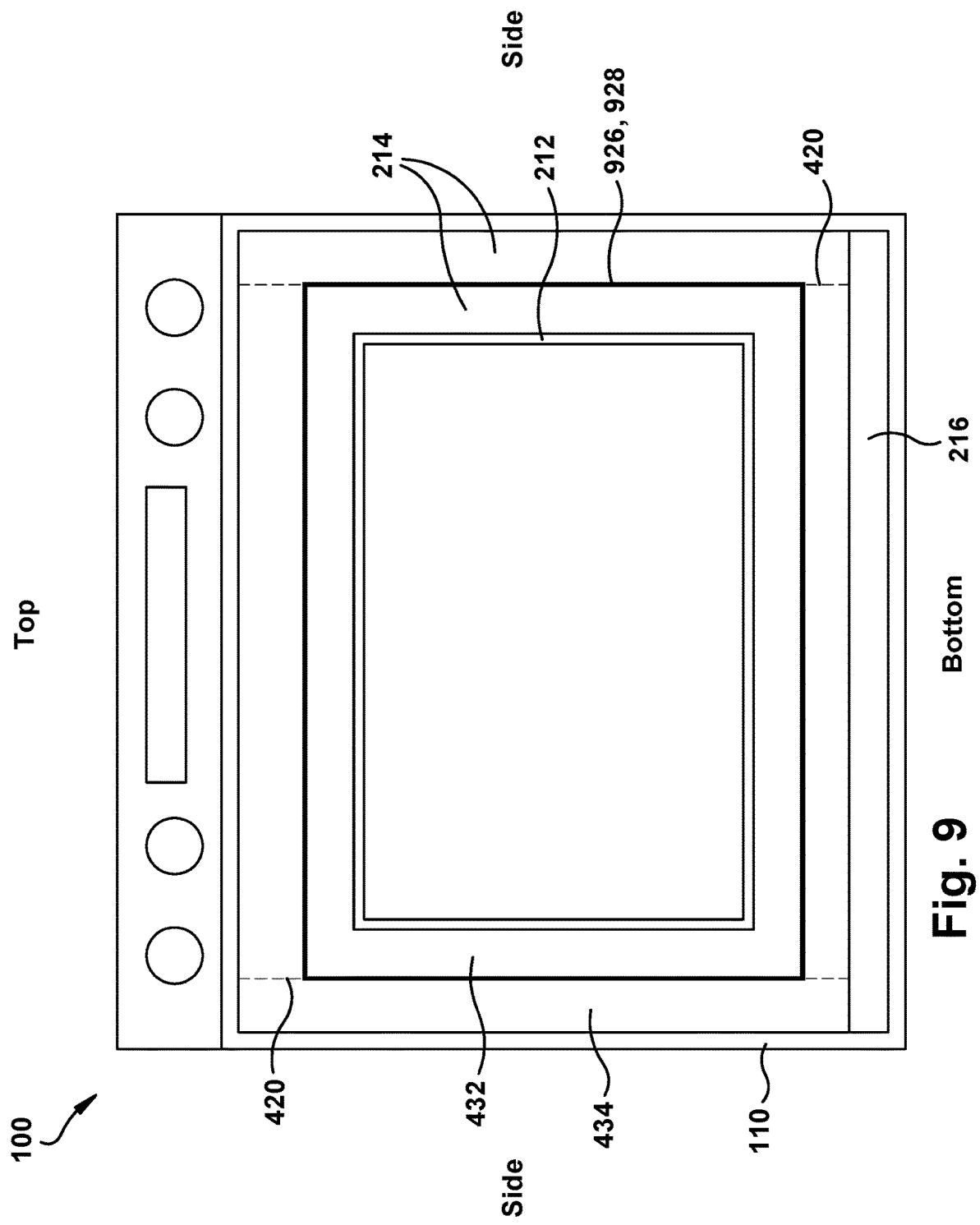
FIG. 9 is a cross-sectional view taken along the plane 2-2 in FIG. 1 illustrating an exemplary embodiment of a thermal oven comprising insulating material including channels, and a reflective barrier.

FIG. 9 is a cross-sectional view taken along the plane 2-2 in FIG. 1 illustrating an exemplary embodiment of a thermal oven 100 comprising insulating material 214 including channels 420, and a reflective barrier 926. The insulating material 214 comprises an inner layer 432 and an outer layer 434. In one embodiment, the insulating material 214 extends to the top and side surfaces of the enclosure 110, which allows the insulating material 214 to be more efficient in containing the heat within the heating compartment 212. Moreover, in this exemplary embodiment, a reflective barrier 926 is disposed between the two layers of insulating material 214, which directs the heat back towards the heating compartment 212. In this embodiment, the reflective barrier 926 comprises one reflective member 928 that covers the entire outer surface of the inner layer 432 of the insulating material 214. The reflective barrier 926 improves the efficiency of the thermal oven 100. Additionally, the channels 420 are located in a manner that allows air to travel to the most likely hotspot areas. In this embodiment, air travels from the air gap 216 through the channels 420 to the most likely hotspot areas within the enclosure 110. The above-mentioned embodiment is only exemplary. The reflective barrier 926 could be made up of one reflective member 928, or the reflective barrier 926 could comprise several reflective members 928. Furthermore, the reflective barrier 926 could cover the entire outer surface of the inner layer of the insulating material 214, or the reflective barrier could cover an individual area or several individual areas of the inner layer of the insulating material 214. A reflective barrier 926 may also be located on the inner and/or outer surface of the inner layer 432 and/or the outer layer 434 of the insulating material 214.

Figure 10:
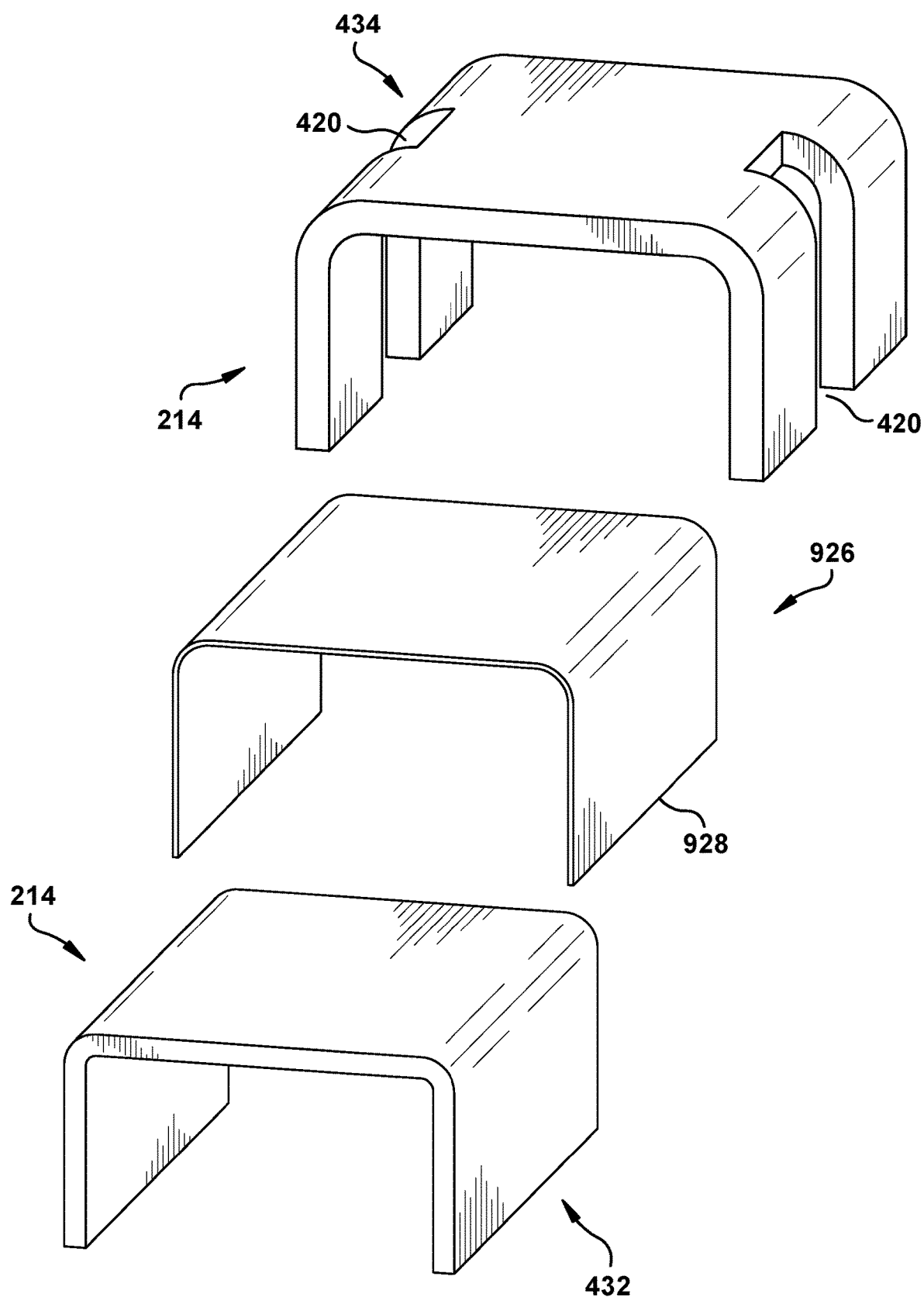
FIG. 10 is a perspective view illustrating an exemplary embodiment of the insulating material including channels and the reflective barrier provided in FIG. 9.

FIG. 10 is a perspective view illustrating an exemplary embodiment of the insulating material 214 including channels 420 and the reflective barrier 926 provided in FIG. 9. In the illustrated embodiment, the inner layer 432 of the insulating material 214, the outer layer 434 of the insulating material 214, and the reflective barrier 926 are separated pieces that are configured to be attached to each other. In the exemplary embodiment provided in FIG. 10, the channel 420 is located in the outer layer 434 of the insulating material 214, and the channel 420 is formed from both the outer layer 434 of the insulating material 214 and the reflective barrier 926. However, a channel 420 may be configured in several different ways. The walls of a channel 420 may be made solely by the outer layer 434, or the channel 420 may be formed by an combination of the inner layer 432, outer layer 434, and reflective barrier 926. A channel may be located in both the inner layer 432 and outer layer 434 of the insulating material 214. A channel 420 may be located only in the inner layer 432 of the insulating material 214, or a channel 420 may be located only in the outer layer 434 of the insulating material 214. Additionally, in the exemplary embodiment provided in FIG. 10, the reflective barrier 926 is made of only one reflective member 928. However, the reflective barrier 926 may be made of multiple reflective members 928. The reflective members 928 may be connected to one or more reflective members 928, or the reflective members 928 may be disconnected from other reflective members 928.

Figure 11A:
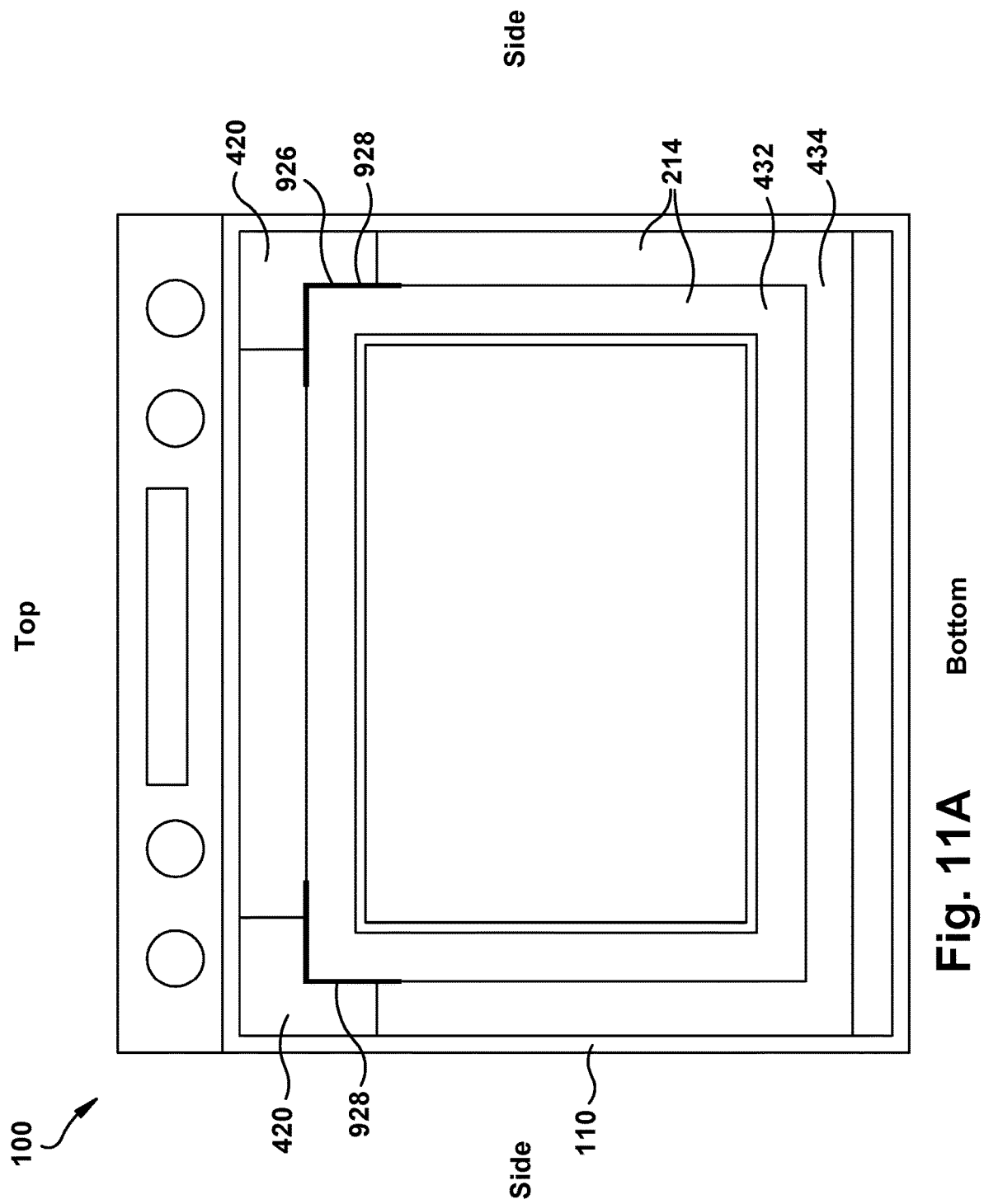
FIG. 11A is a cross-sectional view taken along the plane 2-2 in FIG. 1 illustrating another exemplary embodiment of a thermal oven comprising insulating material including channels, and a reflective barrier.

FIG. 11A is a cross-sectional view taken along the plane 2-2 in FIG. 1 illustrating another exemplary embodiment of a thermal oven 100 comprising insulating material 214 including channels 420, and a reflective barrier 926. In this exemplary embodiment, two layers of insulating material 214 extend to the top and side surfaces of the enclosure 110, which allows the insulating material 214 to be more efficient in containing the heat within the heating compartment 212. Moreover, in this exemplary embodiment, a reflective barrier 926 is disposed between the two layers of insulating material 214, which directs the heat back towards the heating compartment. In this embodiment, the reflective barrier 926 comprises two reflective members 928 that cover at least a part of the upper corners of the inner layer 432 of insulating material 212. The reflective barrier 926 improves the efficiency of the thermal oven 100. The above-mentioned embodiment is only exemplary. The reflective barrier 926 could be made up of one reflective member 928, or the reflective barrier 926 could comprise several reflective members 928. Furthermore, the reflective barrier 926 could cover the entire outer surface of the inner layer 432 of the insulating material 214, or the reflective barrier could cover an individual area or several individual areas of the inner layer of the insulating material 214. A reflective barrier may also be located on the inner and/or outer surface of the inner layer 432 and/or outer layer 434 of the insulating material 214. Additionally, the channels 420 are located in a manner that allows air to travel to the most likely hotspot areas. In this embodiment, the channels 420 are formed by the outer layer 434 of the insulating material 214 and the reflective barrier 926. However, a channel 420 may be configured in several different ways. The walls of a channel 420 may be made solely by the outer layer 434, or the walls may be made solely by the inner layer 432. A channel may be located in both the inner layer 432 and outer layer 434 of the insulating material 214. A channel 420 may be located only in the inner layer 432 of the insulating material 214, or a channel 420 may be located only in the outer layer 434 of the insulating material 214. In this embodiment, air travels through the channels 420 to reduce the temperature in the upper corners of the enclosure 110.

Figure 11B:
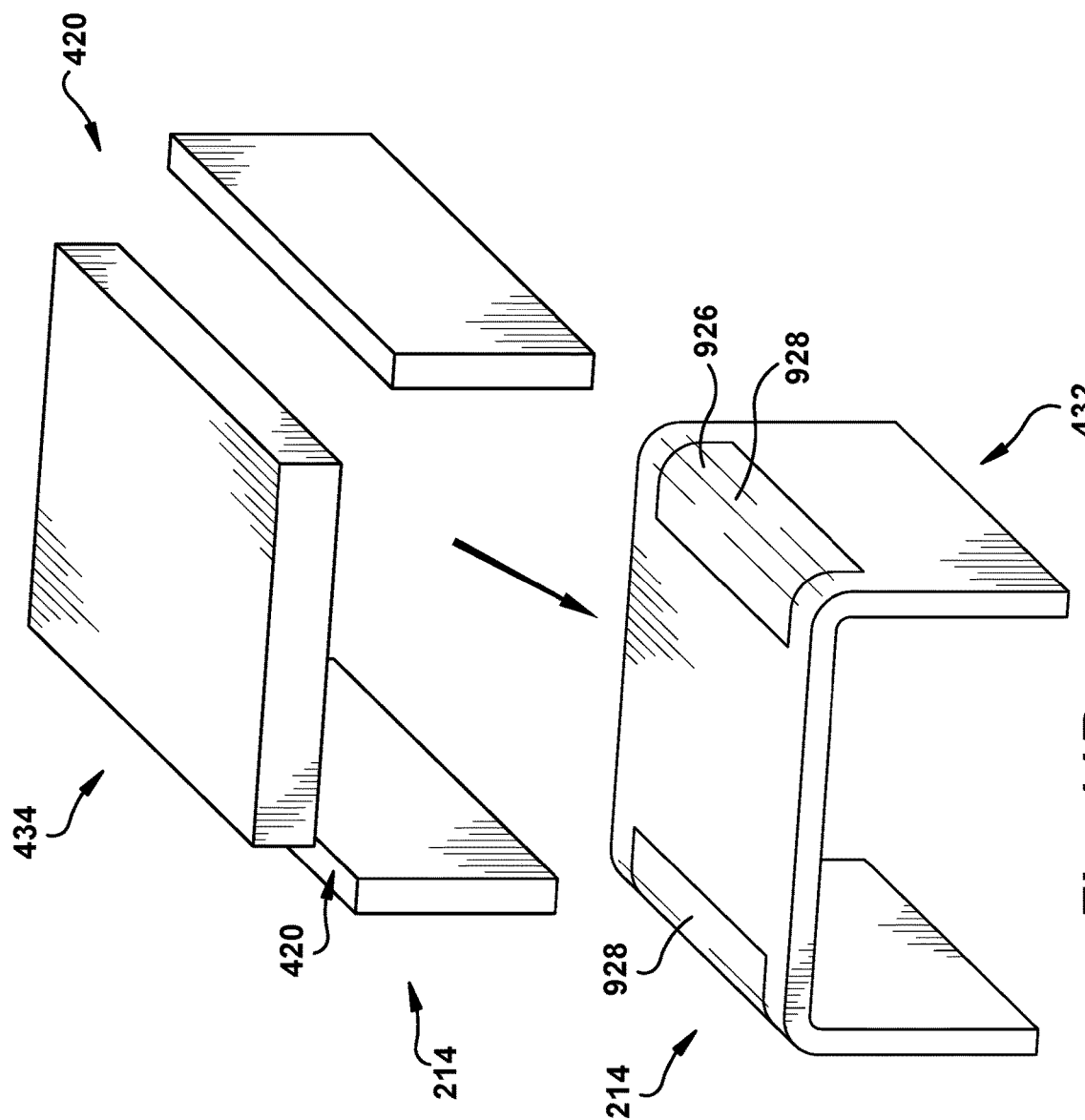
FIG. 11B is a perspective view illustrating an exemplary embodiment of the insulating material including channels and the reflective barrier provided in FIG. 11A.

FIG. 11B is a perspective view illustrating an exemplary embodiment of the insulating material 214 including channels 420 and the reflective barrier 926 provided in FIG. 11A. In the illustrated embodiment, the inner layer 432 of the insulating material, the outer layer 434 of the insulating material 214, and the reflective barrier 926 are separate pieces that are configured to be attached to each other. In the exemplary embodiment provided in FIG. 11B, the channel 420 is located in the outer layer 434 of the insulating material 214, and the channel 420 is formed from both the outer layer 434 of the insulating material 214 and the reflective barrier 926. However, a channel 420 may be configured in several different ways. The walls of a channel 420 may be made solely by the inner layer 432, outer layer 434, or reflective barrier 926. Alternatively, the walls of a channel 420 may be formed by any combination of the inner layer 432, outer layer 434, and reflective barrier 926. A channel 420 may be located in both the inner layer 432 and outer layer 434 of the insulating material 214. A channel 420 may be located only in the inner layer 432 of the insulating material 214. Additionally, in the exemplary embodiment provided in FIG. 11B, the reflective barrier 926 is made of two reflective members 928. However, the reflective barrier 926 may be made of one or more reflective members 928. In the exemplary embodiment, the reflective members are disconnected from each other. However, the reflective members 928 may be connected to one or more reflective members 928, or the reflective members 928 may be disconnected from other reflective members 928.

Figure 12:
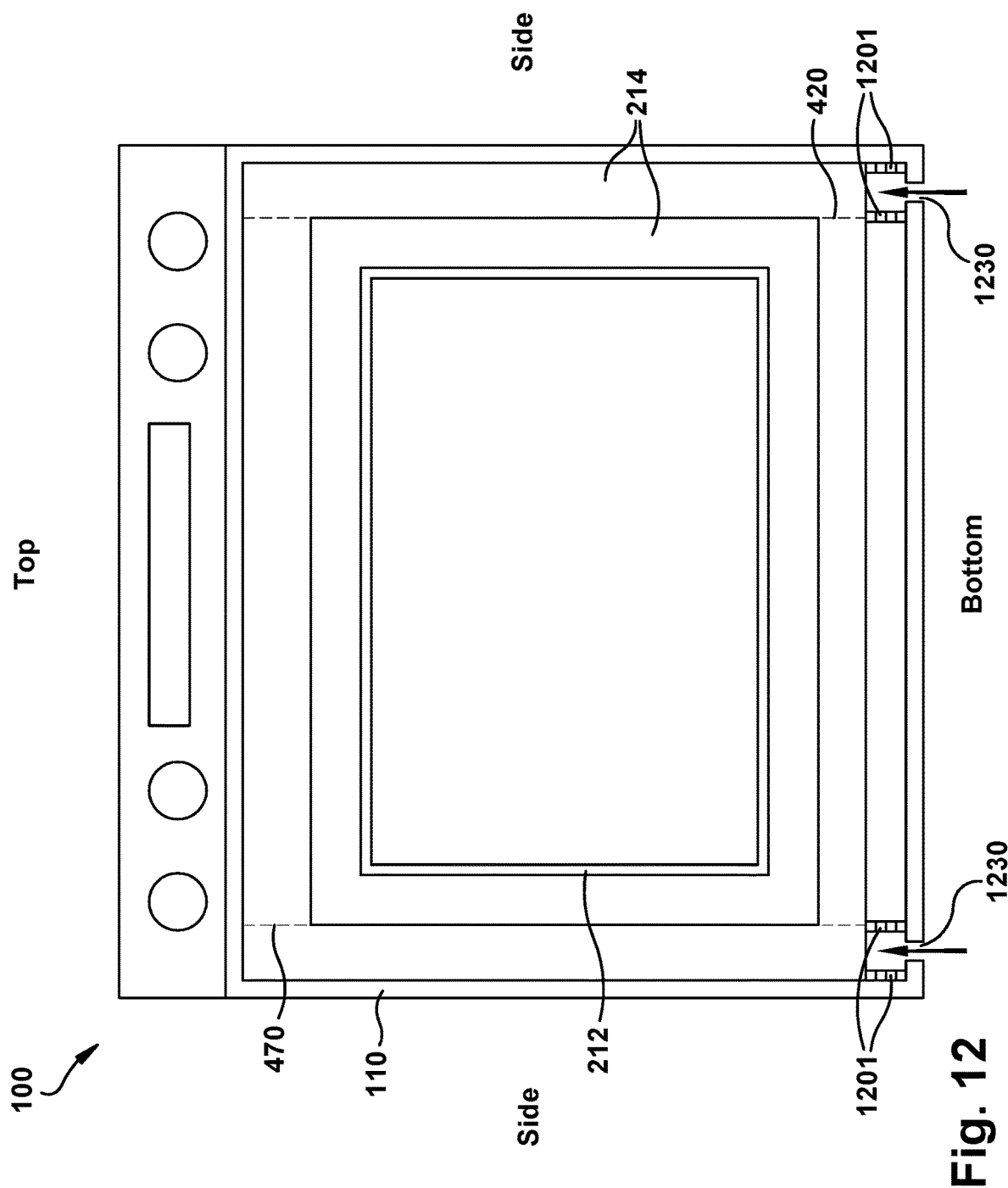
FIG. 12 is a cross-sectional view taken along the plane 2-2 in FIG. 1 illustrating an exemplary embodiment of a thermal oven comprising insulating material including channels, and a slot that allows air into the enclosure.

FIG. 12 is a cross-sectional view taken along the plane 2-2 in FIG. 1 illustrating an exemplary embodiment of a thermal oven 100 comprising insulating material 214 including channels 420, and one or more slots 1230 that allows air into the enclosure 110. In one embodiment, two layers of insulating material 214 extend to the top and side surfaces of the enclosure 110, which allows the insulating material 214 to be more efficient in containing the heat within the heating compartment 212. Additionally, the channels 420 are located in a manner that allows air to travel to potential hotspot areas. In this embodiment, air from outside the enclosure 110 enters the enclosure 110 through slot 1230. After the air enters the enclosure 110, guide walls 1201 direct the air towards the channels 420. The above-mentioned embodiment is only exemplary. A slot 1230 can be used on any thermal oven 100 described in this application.

Figure 13A:
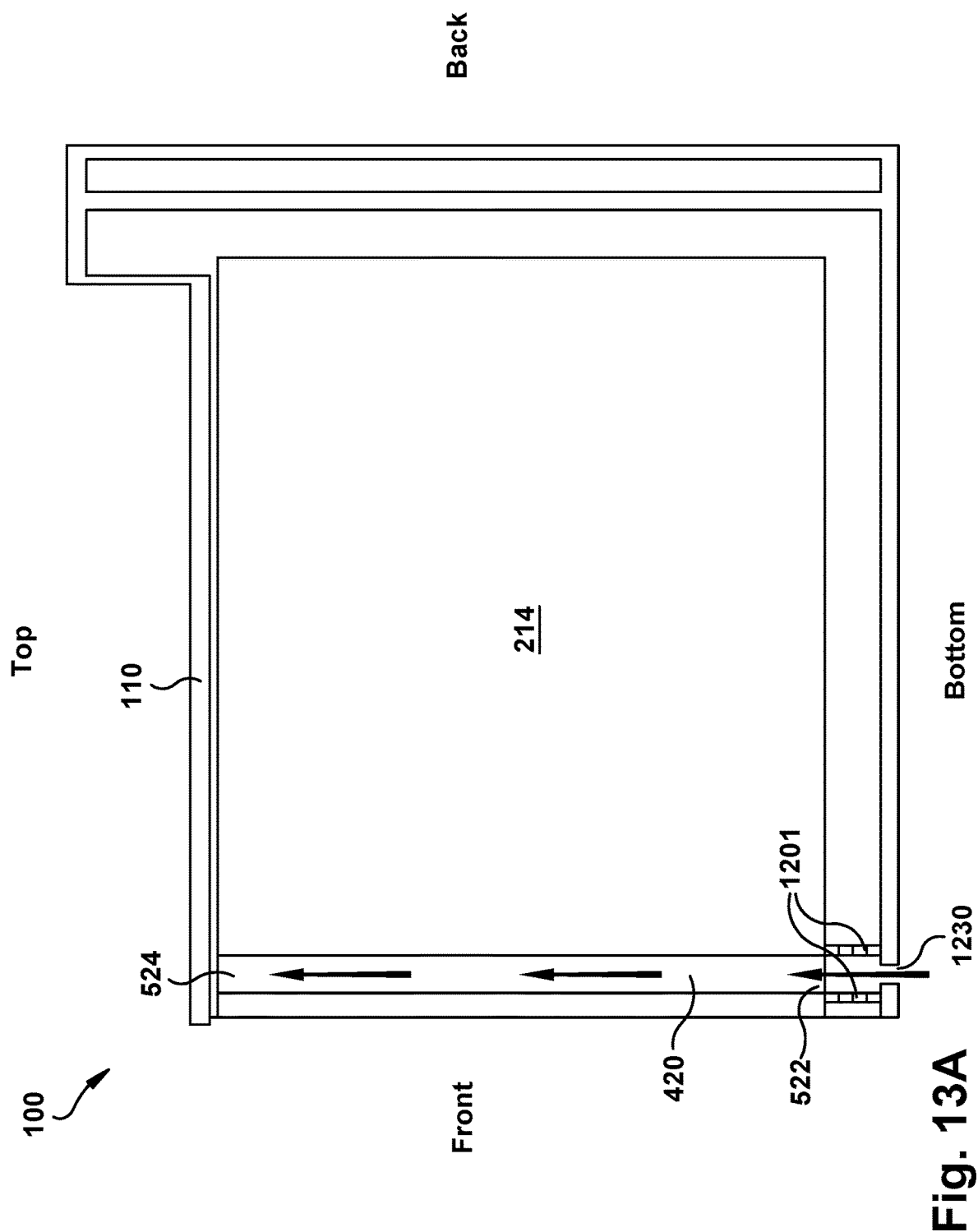
Figure 13C:
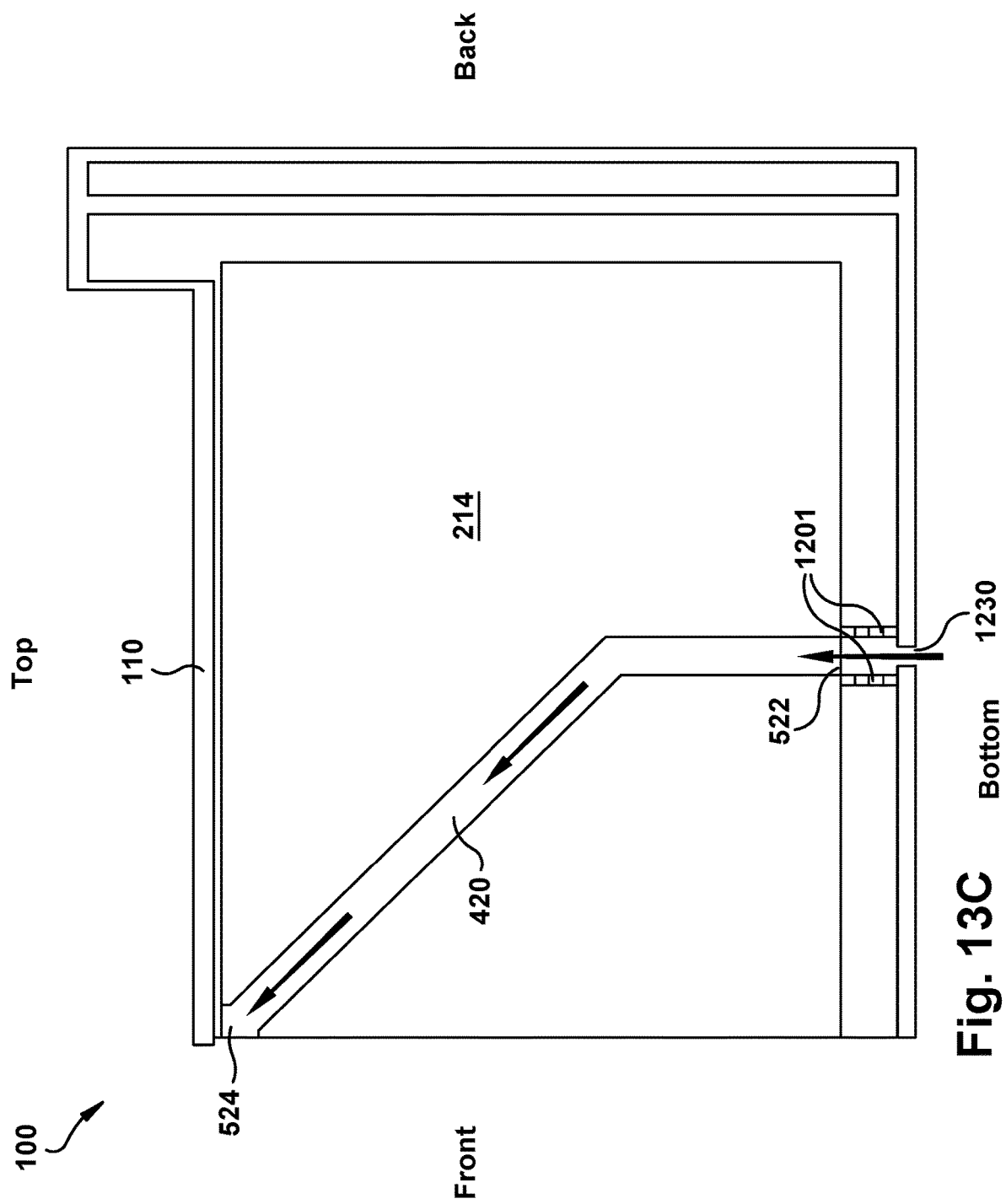

FIGS. 13A-13C are cross-sectional views taken along the plane indicated by lines 5-5 in FIG. 1 illustrating exemplary embodiments of the thermal oven 100 comprising insulating material 214 including channels 420, and the slot 1230 that allows air into the enclosure 110 provided in FIG. 12. In the following exemplary embodiments, air enters the enclosure 110 through slot 1230, and guide walls 1201 direct the air towards the channels 420. Then, the air enters the channel 420 through the inlet 522, and air exits the channel 420 through the outlet 524. In one embodiment, as shown in FIG. 13A, the slot 1230 is located toward the front of the enclosure 110, and the channel 420 is in a straight vertical line from the slot 1230 to a potential hotspot area. In another embodiment, as shown in FIG. 13B, the slot 1230 is located near the center of the enclosure 110, and the channel 420 is in a straight vertical line from the slot 1230 to a potential hotspot area. In a different embodiment, as shown in FIG. 13C, the slot 1230 is located near the center of the enclosure 110, the inlet 522 of the channel 420 is in a straight line above the slot 1230, and the outlet 524 of the channel 420 is near the top of the front surface of the enclosure 110. The above-mentioned embodiments are only exemplary. A channel 420 may be configured in several different ways, such as straight vertical or horizontal lines, diagonal lines, curved lines, or any combination thereof. Additionally, the inlet 522 of the channel 420 may be located in any position that allows the channel 420 to receive a desired amount and/or quality of air. Also, the outlet 524 of the channel 420 may be located in any location that potentially could be a hotspot area. Moreover, the slot 1230 may be located in any position on the enclosure 110 that allows air to enter the enclosure 110 and travel through the channels 420.

FIGS. 14 and 15 are cross-sectional cutouts of an exemplary embodiment of insulating material 214 including channels 420. In certain embodiments, as provided in FIGS. 14 and 15, the insulating material 214 can be compressed to form a channel 420. Several different methods may be used to compress the insulating material 214, for example, any type of fastener may be used. In one exemplary embodiment, as shown in FIG. 14, the insulating material 214 may be compressed using clips 1450. In another exemplary embodiment, as shown in FIG. 15, the insulating material 214 may be compressed using pins 1552 and a plate 1554. However, the above-mentioned embodiments are only exemplary, and the insulating material may be compressed in other ways.

FIG. 16 is a cross-sectional cutout of an exemplary embodiment of insulating material 214 including channels 420. In one embodiment, as provided in FIG. 16, a channel 420 can be cut out of insulating material 214 or molded into the insulating material 214. A cutout 1656 or mold depression 1656 that forms a channel 420 may be made in several different shapes. A cutout 1656 may take the form of a rectangular, circular, or triangular shape, or any other shape that allows air to flow to a desired location.

Figure 17:
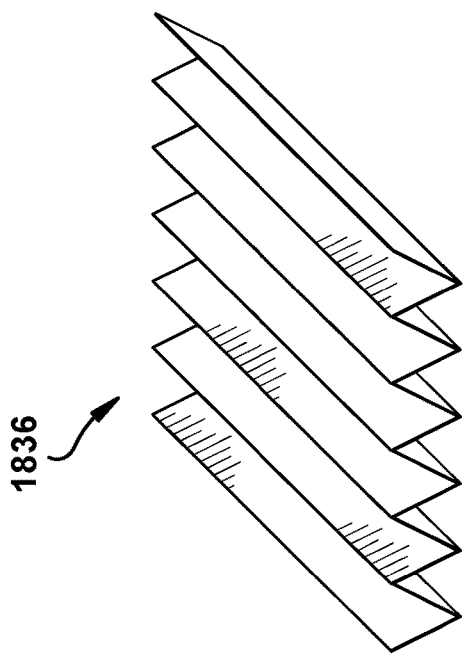
FIG. 17 is a perspective view illustrating an exemplary embodiment of insulating material including channels.

FIG. 17 is a perspective view illustrating an exemplary embodiment of insulating material 214 including channels 420. In one embodiment, as provided in FIG. 17, one or more channels 420 may be located on the top surface 1701 of the insulating material 214. As discussed previously in the present application, the channels 420 allow air to move to a desired location to reduce the temperatures in those locations. Therefore, channels 420 may be located in any location in the insulating material 214 that allows air to move to the desired locations.

Figure 18B:
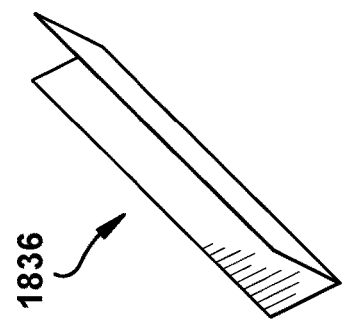
FIGS. 18A-18C are perspective views of different embodiments of molds used to make channels in insulating material.
Figure 18C:
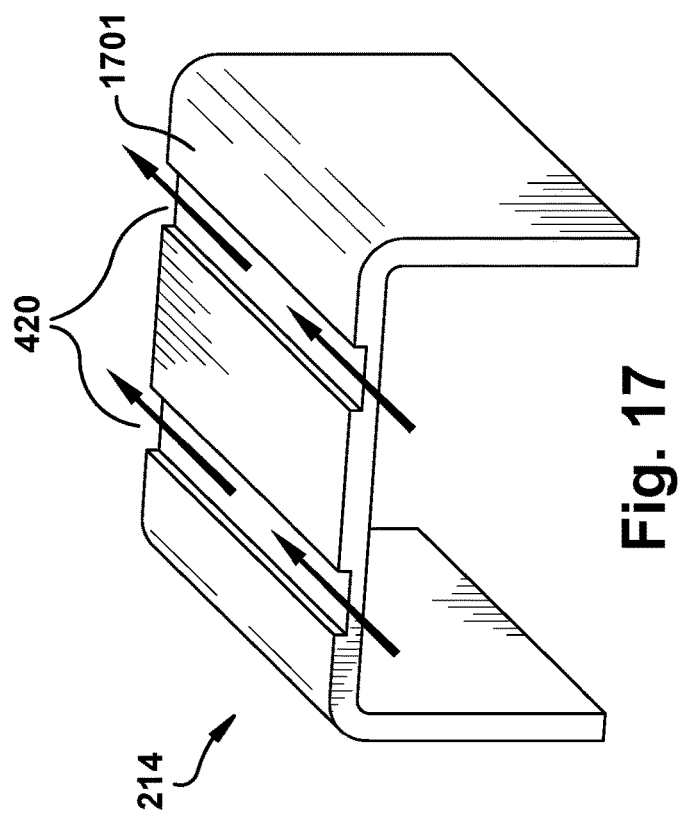
Figure 18A:
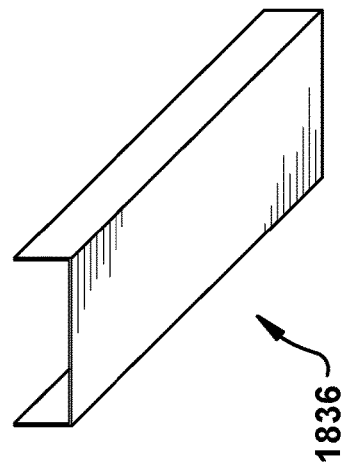

FIGS. 18A-18C are perspective views of different embodiments of molds 1836 used to make channels in insulating material. Molds 1836 are used to design the shape of a channel 420. A mold 1836 may take several forms. In one exemplary embodiment, as shown in FIG. 18A, a mold 1836 may provide a rectangular shape for a channel 420. In another exemplary embodiment, as shown in FIG. 18B, a mold 1836 may provide a triangular shape for a channel 420. In yet another exemplary embodiment, as shown in FIG. 18C, a mold 1836 may provide several channels 420. The above-mentioned embodiments are only exemplary. A mold 1836 may create any shape, such as straight-edges, curved edges, rectangular shapes, or circular shapes. Also, a mold 1836 may have a large depth, small depth, large width, small width, large length, or small length. Any of the above-mentioned forms for a mold 1836 or channel 420 may be used on any of the embodiments for insulating material 214 mentioned in the present application.

Figure 19:
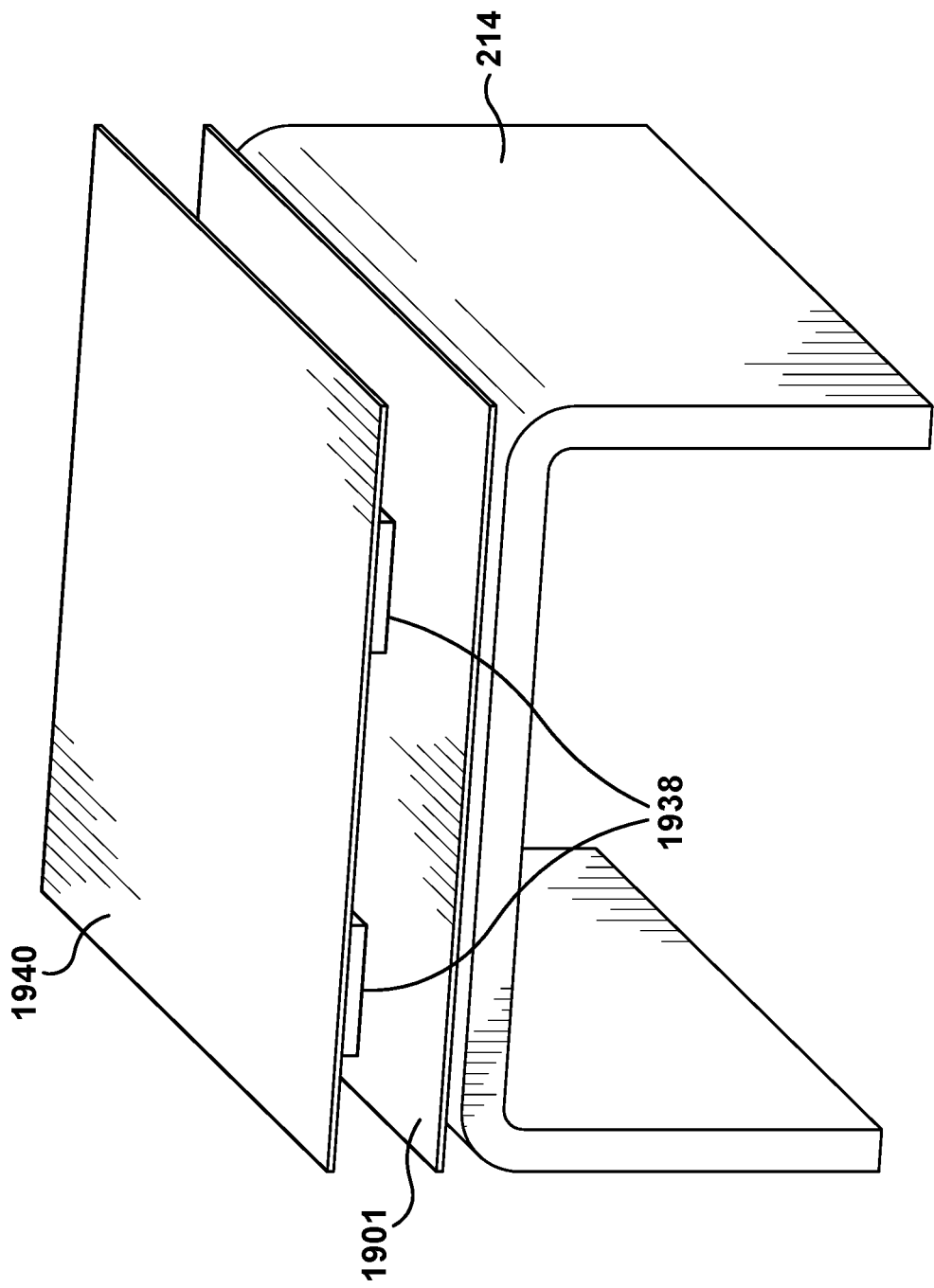
FIG. 19 is a perspective view of a top portion of a range, insulating material, and a support system for the top portion of the range.

FIG. 19 is a perspective view of a top portion of a range 1940, insulating material 214, and a support system for the top portion of the range 1940. In one embodiment, as provided in FIG. 19, the support system comprises supporting members 1938 and a support platform 1901. In this embodiment, the supporting members 1938 are independent of the insulating material 214. The supporting members 1938 are placed on a supporting platform 1901 to support the top portion of range 1940 in an appropriate position. It is desirable to have a support system that does not include multiple parts.

Figure 20A:
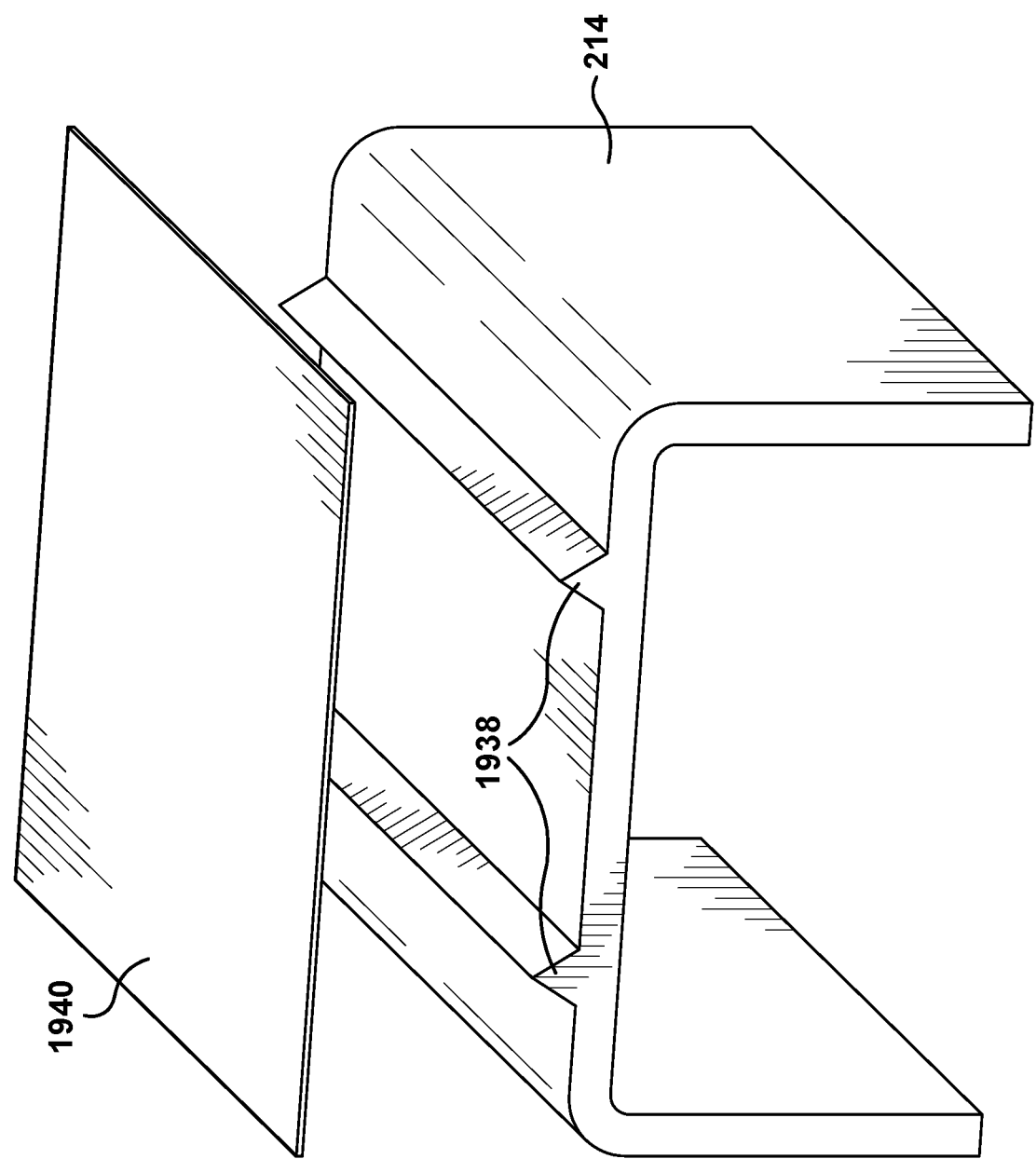
FIG. 20A is a perspective view of a top portion of a range and insulating material comprising a support system for the top portion of the range.
Figure 20B:
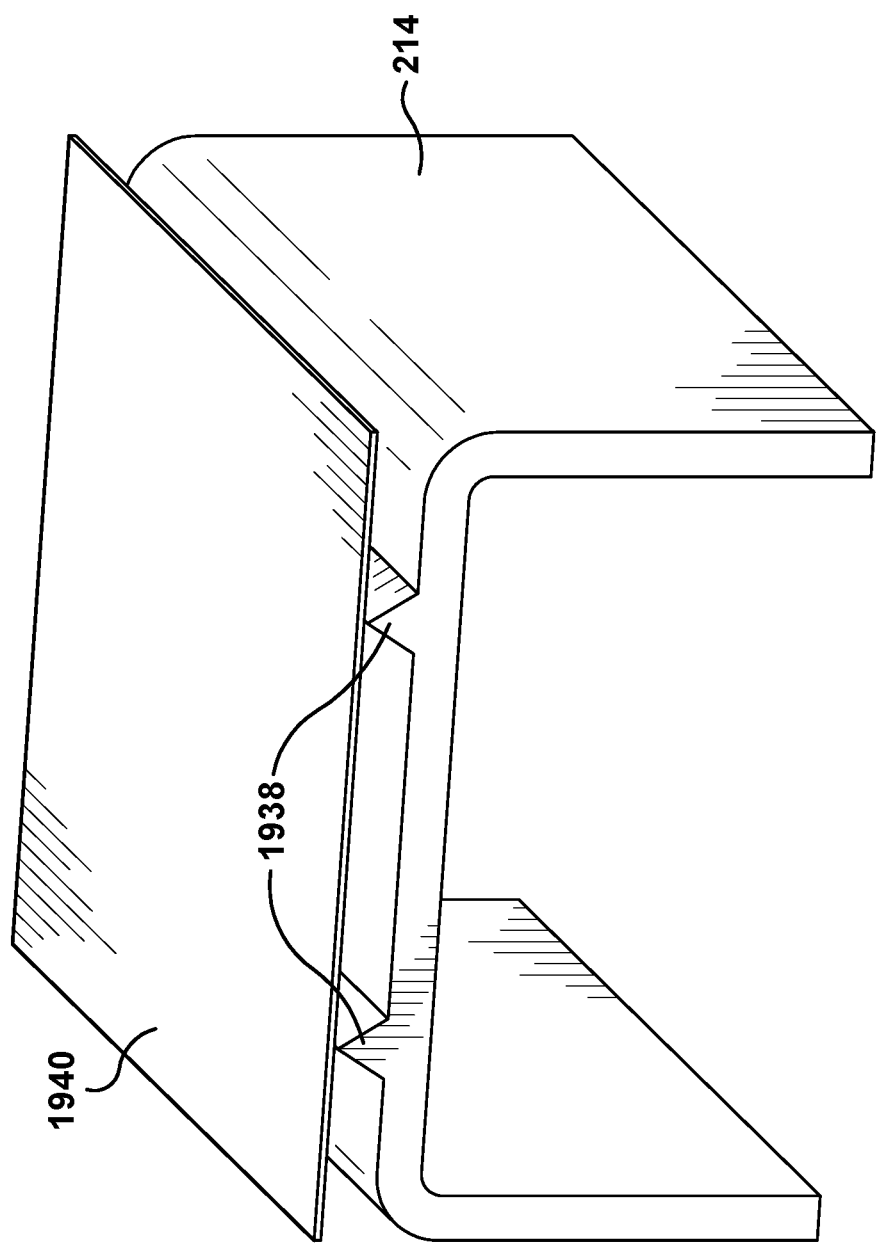
FIG. 20B is a perspective view of a top portion of a range and insulating material comprising a support system for the top portion of the range.

FIGS. 20A and 20B are perspective views of a top portion of a range 1940 and insulating material 214 comprising a support system for the top portion of the range 1940. In one exemplary embodiment, as provided in FIGS. 20A and 20B, the insulating material 214 comprises the support members 1938. The illustrated support members 1938 extend from the insulating material 214. The support members 1938 can be formed in or on the insulating material 214 using any of the methods discussed in the present application regarding forming channels in the insulating material 214. In one embodiment, the support members 1938 may have a triangular form, as shown in FIGS. 20A and 20B. However, the support members 1938 may have rectangular forms, circular forms, or any other type of shape that is capable of supporting the top portion of a range 1940. The insulating material 214 comprising support members 1938 may be combined with any of the designs for insulating material 214 comprising channels 420 discussed in the present application. Additionally, the insulating material 214 comprising support members 1938 may be used with insulating material 214 that does not comprise channels.

Figure 21:
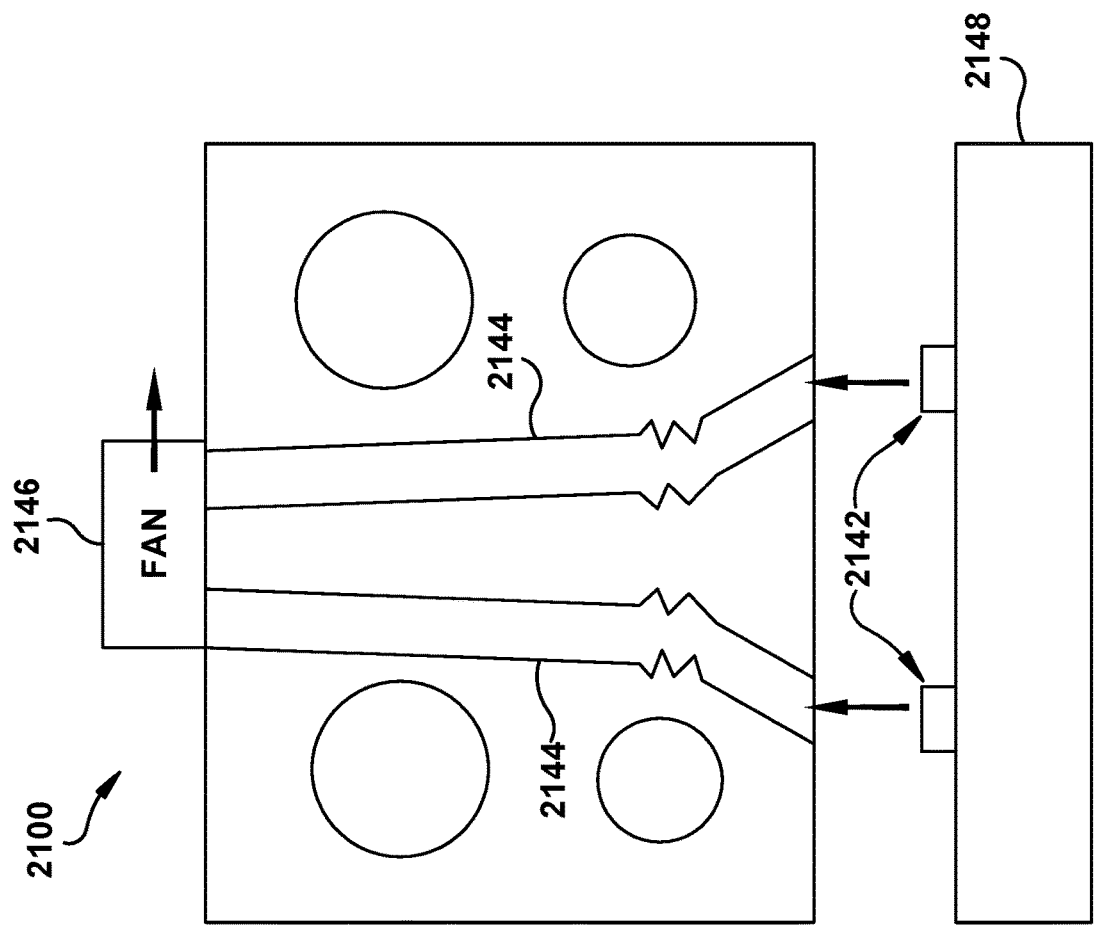
FIG. 21 illustrates a method of extracting heat from the door of a thermal oven including coupling, air ducts, and a fan.

FIG. 21 illustrates an insulation system 2100 that extracts heat from the door 2148 of a thermal oven 100. The insulation system 2100 includes coupling 2142, air ducts 2144, and a fan 2146. The door 2148 of a thermal oven 100 may become hot while the thermal oven 100 is in operation. It is desirable to find a method of reducing the heat within the door 2148. In one embodiment, the door 2148 comprises coupling 2142. The coupling 2142 is received by air ducts 2144, and the air ducts 2144 are attached to a fan 2146. In this embodiment, the fan 2146 extracts heated air through the air ducts 2144 from the door 2148. In an exemplary embodiment, the air ducts 2144 are formed in the insulating material 214. The air ducts 2144 may be formed in the insulating material 214 in a wide variety of different ways. For example, the air ducts may be formed in any of the manners for forming channels 420 that are disclosed herein.

The present application discloses several different embodiments of thermal appliances, such as thermal ovens 100, with features that produce a reduction in surface temperature as compared to existing thermal appliances. Any of the features of any of the embodiments disclosed in this application can be combined with any of the features of any of the other embodiments disclosed by this application. Additional exemplary embodiments of the present application comprise combinations and subcombinations of the features of the exemplary embodiments described above.

What is claimed is:

1. A thermal appliance comprising:
   an enclosure;
   a heating compartment within the enclosure; and
   a fibrous insulating material disposed between the heating compartment and the enclosure;
   wherein the fibrous insulating material comprises one or more layers; and
   wherein a portion of at least one layer is compressed such that the compressed portion forms a channel in the fibrous insulating material to allow air flow in a space between the enclosure and the heating compartment.

2. The thermal appliance of claim 1, wherein the fibrous insulating material comprises one layer.

3. The thermal appliance of claim 1, wherein the fibrous insulating material comprises an inner layer and an outer layer,
   wherein the inner layer is closer to the heating compartment than the outer layer, and
   wherein the outer layer is closer to the enclosure than the inner layer.

4. The thermal appliance of claim 3, wherein the channel is located within the outer layer of the fibrous insulating material.

5. The thermal appliance of claim 3, further comprising one or more reflective barriers in between the inner layer and outer layer of the fibrous insulating material.

6. The thermal appliance of claim 1, wherein the enclosure comprises one or more slots that allow air from outside the enclosure to enter the channel.

7. The thermal appliance of claim 1, wherein the enclosure comprises a front surface, a back surface, a top surface, a bottom surface, and two opposing side surfaces.

8. The thermal appliance of claim 7, wherein the channel comprises a first end and a second end, and
   wherein the first end is adjacent to an air gap at the bottom surface of the enclosure and the second end is adjacent to the top surface of the enclosure.

9. The thermal appliance of claim 8, wherein the channel is parallel to the front surface of the enclosure.

10. The thermal appliance of claim 8, wherein the second end of the channel is adjacent to a corner made by the front surface, the top surface, and one of the opposing side surfaces.

11. The thermal appliance of claim 10, wherein the channel has a first portion that extends from the first end to an intermediate point along a straight vertical line and a second portion that extends from the intermediate point to the second end along a diagonal line.

12. The thermal appliance of claim 10, wherein the first end of the channel is located in a position such that the channel is not parallel to the front surface of the enclosure.

13. The thermal appliance of claim 1, wherein the fibrous insulating material comprises glass fibers.

14. The thermal appliance of claim 1, wherein the fibrous insulating material is binderless.

15. The thermal appliance of claim 1, wherein the compressed portion comprises one or more clips.

16. The thermal appliance of claim 1, wherein the compressed portion comprises a plate attached to the compressed portion via one or more pins.

17. The thermal appliance of claim 3, wherein at least a portion of the inner layer contacts at least a portion of the outer layer.

* * * * *